(12) United States Patent
Hirose

(10) Patent No.: US 9,501,256 B2
(45) Date of Patent: Nov. 22, 2016

(54) INFORMATION PROCESSING APPARATUS, INFORMATION PROCESSING SYSTEM, AND INFORMATION PROCESSING METHOD

(71) Applicant: Mitsuhiko Hirose, Tokyo (JP)

(72) Inventor: Mitsuhiko Hirose, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/751,239

(22) Filed: Jun. 26, 2015

(65) Prior Publication Data
US 2016/0004488 A1 Jan. 7, 2016

(30) Foreign Application Priority Data

Jul. 2, 2014 (JP) .................................. 2014-136514

(51) Int. Cl.
*G06F 3/12* (2006.01)
*H04N 1/00* (2006.01)

(52) U.S. Cl.
CPC ........... *G06F 3/1285* (2013.01); *G06F 3/1205* (2013.01); *G06F 3/1275* (2013.01); *H04N 1/00127* (2013.01)

(58) Field of Classification Search
USPC ....................................................... 358/1.15
See application file for complete search history.

(56) References Cited

U.S. PATENT DOCUMENTS

| 2008/0015918 | A1 | 1/2008 | Pangrazio et al. |
| 2008/0154685 | A1* | 6/2008 | Matsuda ............... G06Q 10/06 705/7.27 |
| 2009/0260017 | A1* | 10/2009 | Yoshida ............... G06F 9/5038 718/105 |
| 2012/0300253 | A1 | 11/2012 | Omori |
| 2014/0365587 | A1* | 12/2014 | Hayano ............... G06Q 10/107 709/206 |
| 2015/0082320 | A1* | 3/2015 | Hori ....................... G06Q 10/06 718/107 |

FOREIGN PATENT DOCUMENTS

| JP | 2008-021315 | 1/2008 |
| JP | 2012-243203 | 12/2012 |
| JP | 2015-060306 | 3/2015 |

* cited by examiner

*Primary Examiner* — Ngon Nguyen
(74) *Attorney, Agent, or Firm* — IPUSA, PLLC

(57) ABSTRACT

An information processing apparatus includes a process control unit configured to execute one or more processes with respect to input data in an order defined by definition information, an output unit configured to cause the definition information to be output in a form changeable by a user when a first process of the one or more processes is suspended, an accepting unit configured to accept information indicating a change to the definition information, and an application unit configured to apply the change indicated by the information accepted by the accepting unit to the definition information. The process control unit controls execution of a subsequent process of the one or more processes that is executed after the first process is resumed based on the definition information that reflects the change applied thereto by the application unit.

18 Claims, 16 Drawing Sheets

FIG.7

```
                                                                          500
<flow>
  <id>Flow1</id>  — 510
  ┌─────────────────────────────────────────────────────────────────┐
  │ <plug-in order="1">                                             │
  │   <id>ocr</id>                                                  │ 520
  │   <displayName>OCR</displayName>                                │
  │   <parameters>                                                  │
  │     <keyword type="string" r="true" w="true"> </keyword> — 521  │
  │     <ocrMode type="string" r="true" w="true">0</ocrMode> — 522  │
  │     ------------------------------                              │
  │     ------------------------------                              │
  │   </parameters>                                                 │
  │ </plug-in>                                                      │ 530
  ├─────────────────────────────────────────────────────────────────┤
  │ <plug-in order="2">                                             │
  │   <id>suspend</id>                                              │
  │   <displayName>Suspend</displayName>                            │
  │   <parameters>                                                                    532
  │     <panel type="string" r="false" w="false">mfp</panel> — 531
  │     <panelAddress type="string" r="false" w="false">111.111.111.111</panelAddress>
  │     <panelSize type="string" r="false" w="false">WVGA</panelSize> — 533
  │     <maxWaitingTime type="number" r="false" w="false">3600</maxWaitingTime> — 534
  │     <errorHandling type="string" r="false" w="false">Skip</errorHandling> — 535    536
  │     <displayParameter type="string" r="true" w="true">ocr/keyword</displayParameter>
  │     <displayParameter type="string" r="true" w="true">smtp/to1</displayParameter> — 537
  │     <displayParameter type="string" r="true" w="true">smtp/cc1</displayParameter> — 538
  │     <displayParameter type="string" r="true" w="true">smtp/cc2</displayParameter> — 539
  │     ------------------------------
  │     ------------------------------
  │   </parameters>
  │ </plug-in>
  ├─────────────────────────────────────────────────────────────────┤
  │ <plug-in order="3">                                             │
  │   <id>smtp</id>                                                 │ 540
  │   <displayName>Mail Transmission</displayName>                  │
  │   <parameters>                                                  │
  │     <serverIp type="string" r="false" w="false">111.111.111.111</serverIp> — 541
  │     <portNumber type="number" r="false" w="false">25</portNumber> — 542
  │     <to1 type="string" r="true" w="true">xxx1@abc.com</to1> — 543
  │     <cc1 type="string" r="true" w="true">xxx2@abc.com</cc1> — 544
  │     <cc2 type="string" r="true" w="true">xxx3@abc.com</cc2> — 545
  │     <subject type="string" r="false" w="false">[ocr/keyword]</subject> — 546
  │     ------------------------------
  │     ------------------------------
  │   </parameters>
  │ </plug-in>
  └─────────────────────────────────────────────────────────────────┘
<flow>
```

FIG.8

```
<jobInfo>
  <id>111-222-333-444</id>  ~610
  <flow>
    <id>Flow1</id> ~510
    ┌─────────────────────────────────────────────────────────────┐
    │ <plug-in order="1">                                         │
    │   <id>ocr</id>                                              │
    │   <displayName>OCR</displayName>                      520   │
    │   <parameters>                                              │
    │     <keyword type="string" r="true" w="true"> </keyword> ~521│
    │     <ocrMode type="string" r="true" w="true">0</ocrMode>~522│
    │     ---------------------------.                            │
    │     ---------------------------.                            │
    │   </parameters>                                             │
    │ </plug-in>                                            530   │
    ╞═════════════════════════════════════════════════════════════╡
    │ <plug-in order="2">                                         │
    │   <id>suspend</id>                                          │
    │   <displayName>Suspend</displayName>                        │
    │   <parameters>                                              │
    │     <panel type="string" r="false" w="false">mfp</panel> ~531│
    │     <panelAddress type="string" r="false" w="false">111.111.111.111</panelAddress>  532│
    │     <panelSize type="string" r="false" w="false">WVGA</panelSize> ~533│
    │     <maxWaitingTime type="number" r="false" w="false">3600</maxWaitingTime> ~534│
    │     <errorHandling type="string" r="false" w="false">Skip</errorHandling>~535  536│
    │     <displayParameter type="string" r="true" w="true">ocr/keyword</displayParameter>│
    │     <displayParameter type="string" r="true" w="true">smtp/to1</displayParameter>~537│
    │     <displayParameter type="string" r="true" w="true">smtp/cc1</displayParameter>~538│
    │     <displayParameter type="string" r="true" w="true">smtp/cc2</displayParameter>~539│
    │     ---------------------------.                            │
    │     ---------------------------.                            │
    │   </parameters>                                             │
    │ </plug-in>                                                  │
    ╞═════════════════════════════════════════════════════════════╡
    │ <plug-in order="3">                                         │
    │   <id>smtp</id>                                       540   │
    │   <displayName>Mail Transmission</displayName>              │
    │   <parameters>                                              │
    │     <serverIp type="string" r="false" w="false">111.111.111.111</serverIp> ~541│
    │     <portNumber type="number" r="false" w="false">25</portNumber> ~542│
    │     <to1 type="string" r="true" w="true">xxx1@abc.com</to1> ~543│
    │     <cc1 type="string" r="true" w="true">xxx2@abc.com</cc1> ~544│
    │     <cc2 type="string" r="true" w="true">xxx3@abc.com</cc2> ~545│
    │     <subject type="string" r="false" w="false">[ocr/keyword]</subject> ~546│
    │     ---------------------------.                            │
    │     ---------------------------.                            │
    │   </parameters>                                             │
    │ </plug-in>                                                  │
    └─────────────────────────────────────────────────────────────┘
  <flow>
  ---------------------------.
  ---------------------------.
<jobInfo>
```

600a

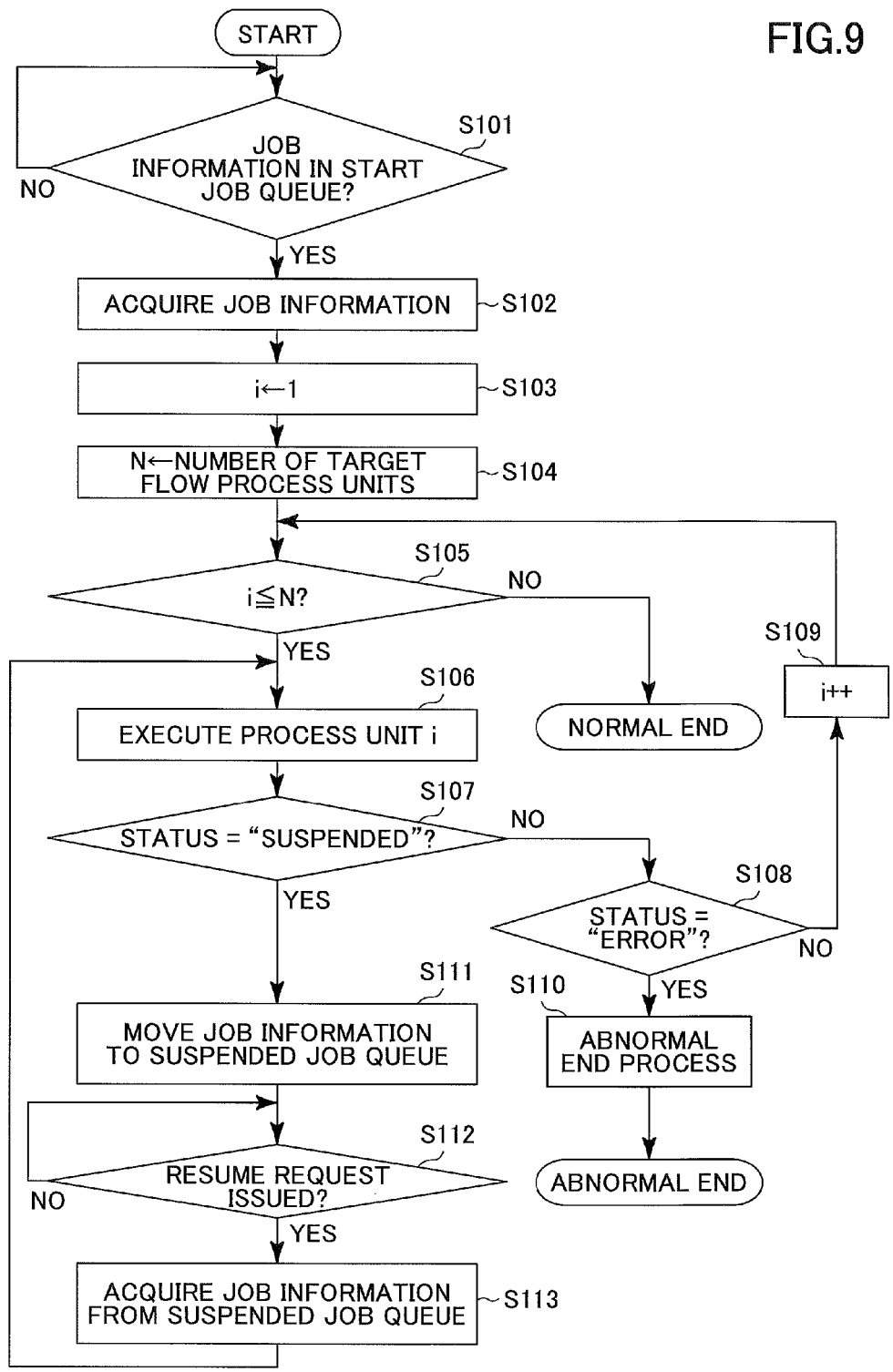

FIG.10

```
<jobInfo>
  <id>111-222-333-444</id>  —610
  <flow>
    <id>Flow1</id>  —510
    <plug-in order="1">
      <id>ocr</id>
      <displayName>OCR</displayName>
      <parameters>
        <keyword type="string" r="true" w="true">abc</keyword>  —521
        <ocrMode type="string" r="true" w="true">0</ocrMode>  —522
        ----------------------------------
        ----------------------------------
      </parameters>
    </plug-in>                                                              520
                                                                            530
    <plug-in order="2">
      <id>suspend</id>
      <displayName>Suspend</displayName>
      <parameters>
        <panel type="string" r="false" w="false">mfp</panel>  —531
        <panelAddress type="string" r="false" w="false">111.111.111.111</panelAddress>  532
        <panelSize type="string" r="false" w="false">WVGA</panelSize>  —533
        <maxWaitingTime type="number" r="false" w="false">3600</maxWaitingTime>  —534
        <errorHandling type="string" r="false" w="false">Skip</errorHandling>  —535
        <displayParameter type="string" r="true" w="true">ocr/keyword</displayParameter>  536
        <displayParameter type="string" r="true" w="true">smtp/to1</displayParameter>—537
        <displayParameter type="string" r="true" w="true">smtp/cc1</displayParameter>—538
        <displayParameter type="string" r="true" w="true">smtp/cc2</displayParameter>—539
        ----------------------------------
        ----------------------------------
      </parameters>
    </plug-in>

<plug-in order="3">
      <id>smtp</id>
      <displayName>Mail Transmission</displayName>
      <parameters>
        <serverIp type="string" r="false" w="false">111.111.111.111</serverIp>  —541
        <portNumber type="number" r="false" w="false">25</portNumber>  —542
        <to1 type="string" r="true" w="true">xxx1@abc.com</to1>  —543
        <cc1 type="string" r="true" w="true">xxx2@abc.com</cc1>  —544
        <cc2 type="string" r="true" w="true">xxx3@abc.com</cc2>  —545
        <subject type="string" r="false" w="false">{ocr/keyword}</subject>  —546
        ----------------------------------
        ----------------------------------
      </parameters>
    </plug-in>                                                              540
  <flow>
  ----------------------------------
  ----------------------------------
<jobInfo>
```

600b

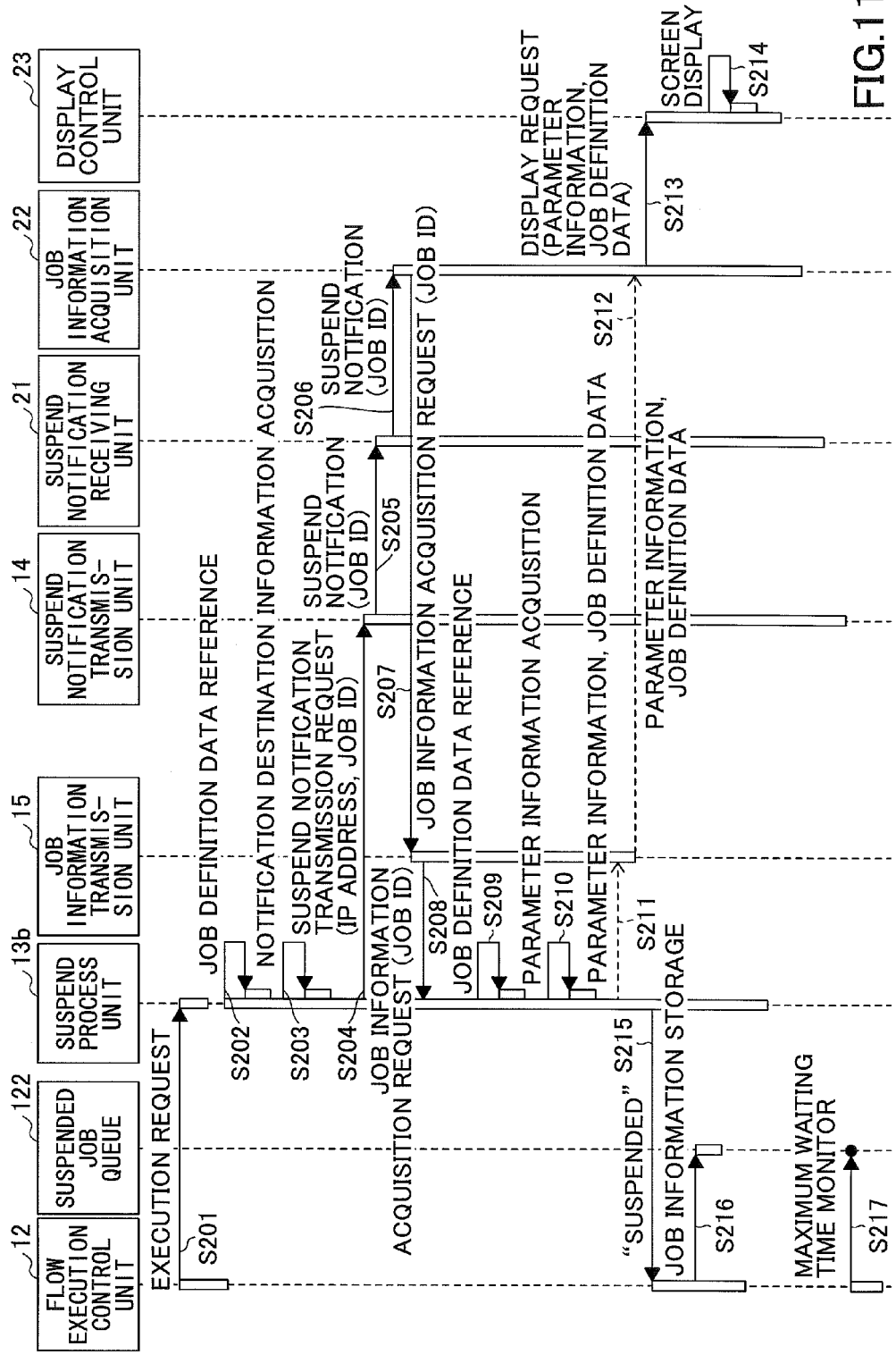

FIG.17

```
                                                                    ┌─ 600c
<jobInfo>
  <id>1111-2222-3333-4444</id> ─ 610
  <flow>
    <id>Flow1</id> ─ 510
  ┌─────────────────────────────────────────────────────────┐
  │ <plug-in order="1">                                     │
  │   <id>ocr</id>                                          │ 520
  │   ..........................                           │
  │ </plug-in>                                              │
  ├─────────────────────────────────────────────────────────┤
  │ <plug-in order="2">                                     │
  │   <id>suspend</id>                                      │ 530
  │   ..........................                           │
  │ </plug-in>                                              │
  ├─────────────────────────────────────────────────────────┤
  │ <plug-in order="3"> ─ 551                               │
  │   <id>imagecorrection</id>                              │
  │   <displayName>Image Correction</displayName>           │
  │   <parameters>                                          │ 550
  │     ..........................                         │
  │     ..........................                         │
  │   </parameters>                                         │
  │ </plug-in>                                              │
  ├─────────────────────────────────────────────────────────┤
  │ <plug-in order="4"> ─ 561                               │
  │   <id>ocr</id>                                          │
  │   <displayName>OCR</displayName>                        │
  │   <parameters>                                          │ 560
  │     <keyword type="string" r="true" w="true"> </keyword>│
  │     <ocrMode type="string" r="true" w="true">2</ocrMode>─562
  │     ..........................                         │
  │   </parameters>                                         │
  │ </plug-in>                                              │
  ├─────────────────────────────────────────────────────────┤
  │ <plug-in order="5"> ─ 547                               │
  │   <id>smtp</id>                                         │
  │   <displayName>Mail Transmission</displayName>          │
  │   <parameters>                                          │
  │     <serverIp type="string" r="false" w="false">111.111.111.111</serverIp> ─ 541
  │     <portNumber type="number" r="false" w="false">25</portNumber> ─ 542
  │     <to1 type="string" r="true" w="true">xxx3@abc.com</to1> ─ 543  │ 540
  │     <cc1 type="string" r="true" w="true">xxx2@abc.com</cc1> ─ 544
  │     <cc2 type="string" r="true" w="true">xxx4@abc.com</cc2> ─ 545
  │     <subject type="string" r="false" w="false">{ocr/keyword}</subject> ─ 546
  │     ..........................                         │
  │     ..........................                         │
  │   </parameters>                                         │
  │ </plug-in>                                              │
  └─────────────────────────────────────────────────────────┘
  <flow>
  ..........................
  ..........................
</jobInfo>
```

INFORMATION PROCESSING APPARATUS, INFORMATION PROCESSING SYSTEM, AND INFORMATION PROCESSING METHOD

BACKGROUND OF THE INVENTION

1. Field of the Invention

The present invention relates to an information processing apparatus, an information processing system, and an information processing method.

2. Description of the Related Art

Systems are known that are capable of executing a pre-defined workflow with respect to image data of a document scanned by an image forming apparatus (see e.g. Japanese Laid-Open Patent Publication No. 2008-021315). In such systems, a workflow is defined such that data may flow in accordance with the business operation flow of a user.

One workflow is basically made up of a combination of processes including a data input process for inputting data, zero or more intermediate processes performed on the input data, and a data output process for outputting the data generated by the above zero or more intermediate processes, for example.

However, there are cases where successive and automatic execution of processes constituting a workflow is not desired. For example, some workflows may involve waiting for a user input during execution of the workflow and executing subsequent processes of the workflow based on the user input.

SUMMARY OF THE INVENTION

In view of the above, an aspect of the present invention is directed to enhancing flexibility of a process flow that is made up of a combination of processes.

According to one embodiment of the present invention, an information processing apparatus is provided that includes a process control unit configured to execute one or more processes with respect to input data in an order defined by definition information, an output unit configured to cause the definition information to be output in a form changeable by a user when a first process of the one or more processes is suspended, an accepting unit configured to accept information indicating a change to the definition information, and an application unit configured to apply the change indicated by the information accepted by the accepting unit to the definition information. The process control unit controls execution of a subsequent process of the one or more processes that is executed after the first process is resumed based on the definition information that reflects the change applied thereto by the application unit.

BRIEF DESCRIPTION OF THE DRAWINGS

FIG. 7 illustrates an example of flow definition data according to an embodiment of the present invention;

FIG. 8 illustrates an example of job definition data at an initial state according to an embodiment of the present invention;

FIG. 9 is a flowchart illustrating exemplary process steps executed by a flow execution control unit according to an embodiment of the present invention;

FIG. 10 illustrates an example of job definition data after executing an OCR process according to an embodiment of the present invention;

FIG. 11 is a sequence chart illustrating exemplary process steps of a suspend process according to an embodiment of the present invention;

FIG. 17 illustrates an example of job definition data that has been changed according to an embodiment of the present invention.

DESCRIPTION OF THE PREFERRED EMBODIMENTS

In the following, embodiments of the present invention are described with reference to the accompanying drawings.

Figure 1:
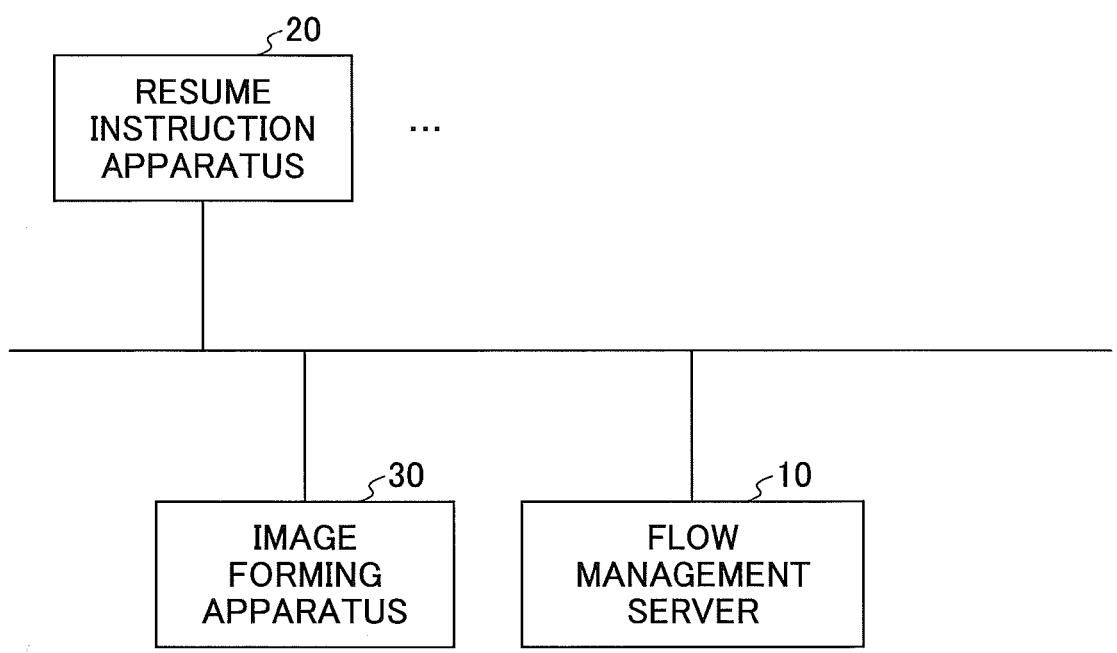
FIG. 1 illustrates an exemplary configuration of an information processing system according to an embodiment of the present invention.

FIG. 1 illustrates an exemplary configuration of an information processing system 1 according to an embodiment of the present invention. In FIG. 1, the information processing system 1 includes a flow management server 10, at least one resume instruction apparatus 20, and at least one image forming apparatus 30 that are interconnected by a network (which may be wired or wireless) such as a LAN (Local Area Network) or the Internet.

The flow management server 10 is a computer that executes a pre-defined workflow with respect to data received via a network. Note that a workflow may refer to a process flow implemented by a given combination of one or more process units (tasks) each implementing a discrete function independently or on their own, for example. Note that the process unit described above may correspond to a so-called "activity" in general workflow terminology.

The resume instruction apparatus 20 is used for inputting a resume instruction for resuming process operations of a workflow that has been suspended. That is, the present embodiment enables implementation of a workflow with process operations that can be temporarily stopped. The resume instruction apparatus 20 may be implemented by a PC (personal computer), a smartphone, a tablet terminal, or the image forming apparatus 30, for example. Also, the resume instruction apparatus 20 may be implemented in the same apparatus as the flow management server 10, for example.

The image forming apparatus 30 is an example of an input source of data (input data) to be processed by a workflow. For example, the image forming apparatus 30 may transmit (input) image data scanned from a document to the flow management server 10 as input data for a workflow. Note that the data for the workflow may be input to a predetermined file of a predetermined folder of a predetermined file server, for example. Also, the data for the workflow may be transmitted by email, for example. Further, the data for the workflow may be stored as a file in a cloud storage, for example.

Figure 2:
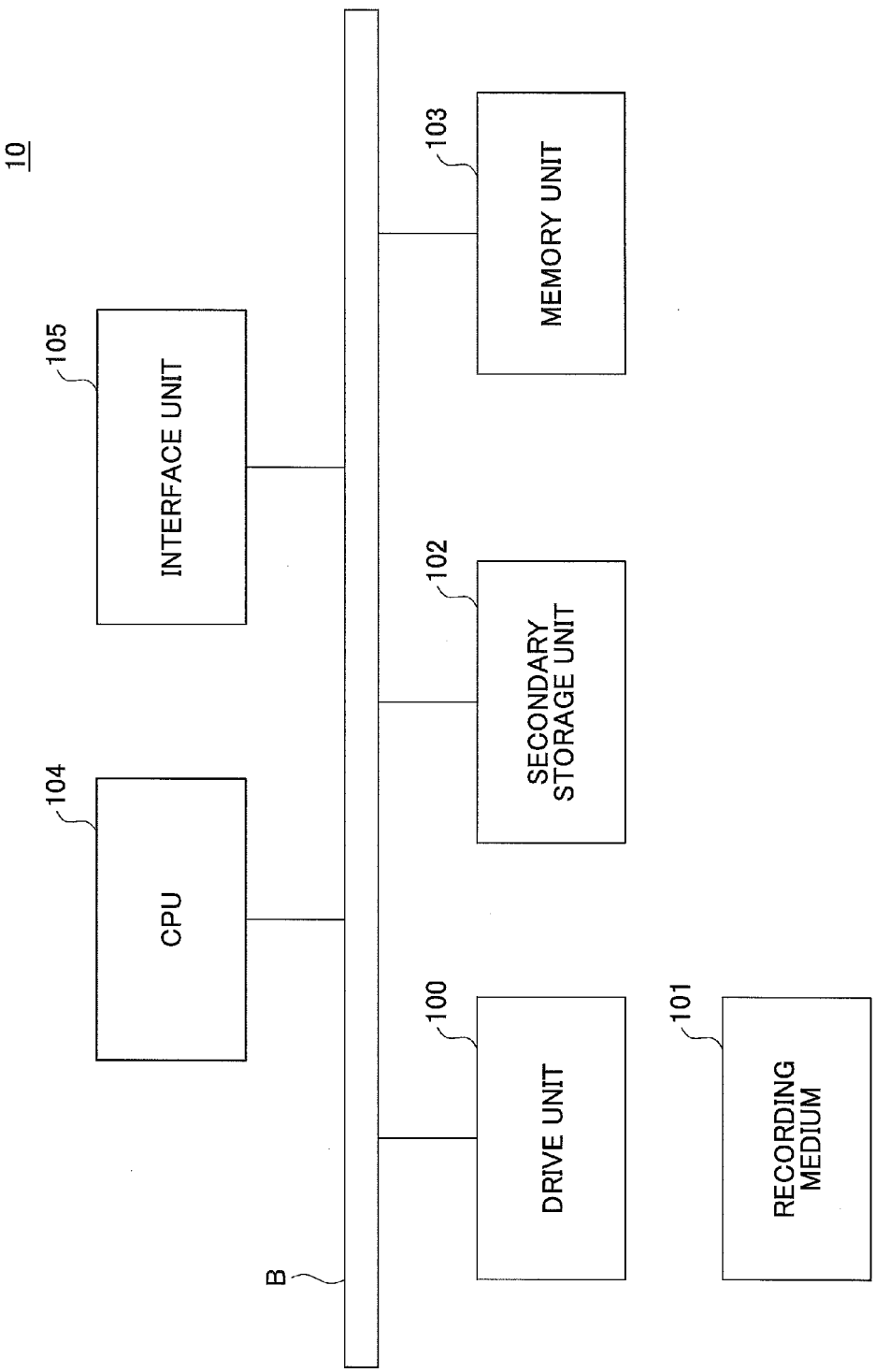
FIG. 2 illustrates an exemplary hardware configuration of a flow management server according to an embodiment of the present invention.

FIG. 2 illustrates an exemplary hardware configuration of the flow management server 10 according to an embodiment of the present invention. In FIG. 2, the flow management server 10 includes a drive unit 100, a secondary storage unit 102, a memory unit 103, a CPU (central processing unit) 104, and an interface unit 105 that are interconnected by a bus B.

A program for executing a process at the flow management server 10 may be provided by a recording medium 101 such as a CD-ROM. When the recording medium 101 storing the program is loaded into the drive unit 100, the program may be installed on the secondary storage unit 102 from the recording medium 101 via the drive unit 100. The program, however, does not necessarily have to be installed from the recording medium 101, and may alternatively be downloaded from some other computer via a network, for example. The secondary storage unit 102 stores files and data in addition to installed programs.

The memory unit 103 reads a program from the secondary storage unit 102 and stores the read program in response to an instruction to activate the program. The CPU 104 implements a function of the flow management server 10 by executing a relevant program stored in the memory unit 103. The interface unit 105 is used as an interface for establishing connection with a network.

Note that in some embodiments, the flow management server 10 may be configured by a computer system including a plurality of computers, for example.

Figure 3:
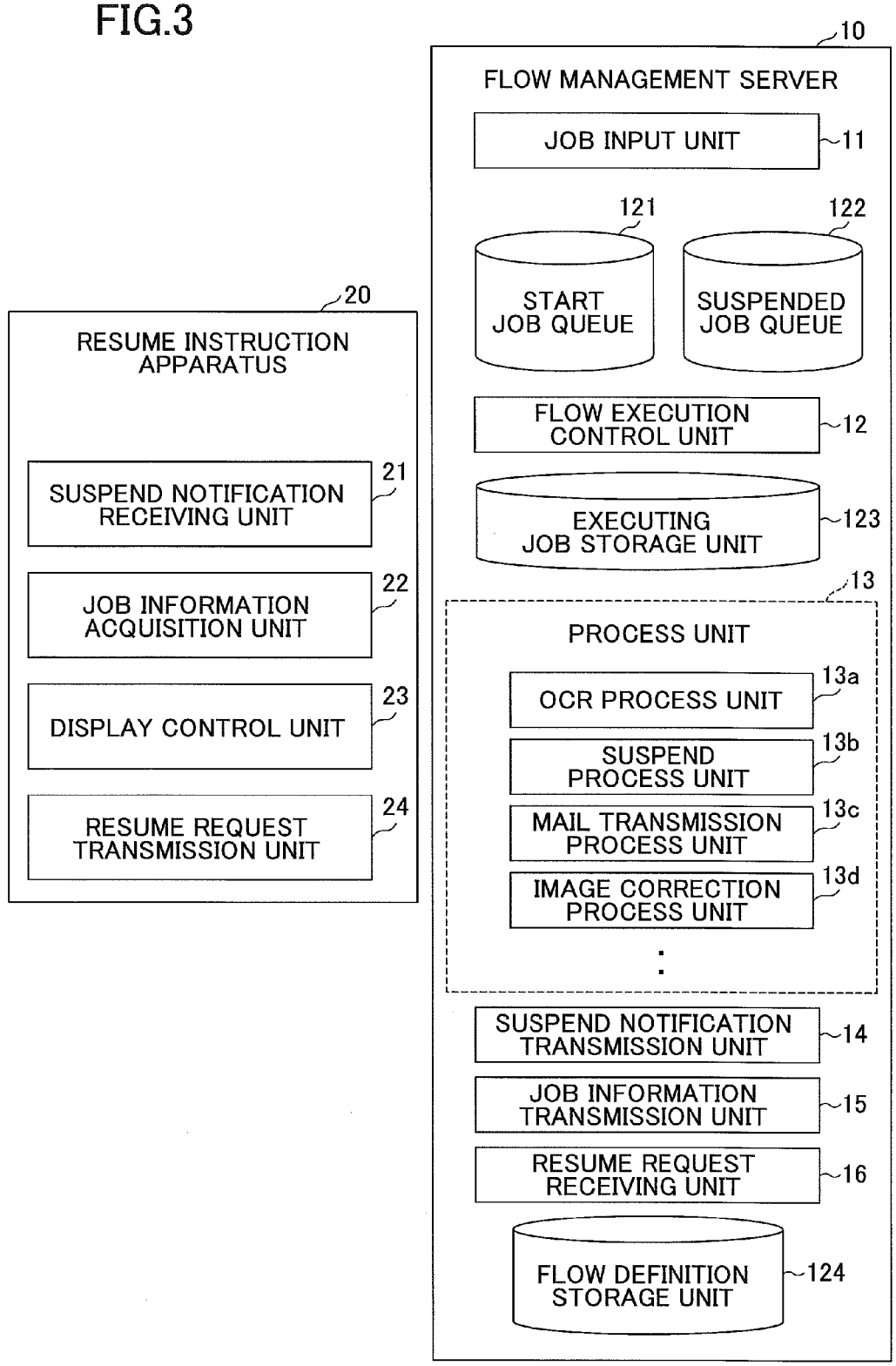
FIG. 3 illustrates exemplary functional configurations of the flow management server and a resume instruction apparatus according to an embodiment of the present invention.

FIG. 3 illustrates exemplary functional configurations of the flow management server 10 and the resume instruction apparatus 20.

In FIG. 3, the flow management server 10 includes a job input unit 11, a flow execution control unit 12, a process unit 13, a suspend notification transmission unit 14, a job information transmission unit 15, and a resume request receiving unit 16. These functional units may be implemented by the CPU 104 executing a relevant program installed on the flow management server 10, for example. The flow management server 10 also implements storage units including a start job queue 121, a suspended job queue 122, an executing job storage unit 123, and a flow definition storage unit 124. These storage units may be implemented by the secondary storage unit 102 or a storage device connected to the flow management server 10 via a network, for example.

The flow definition storage unit 124 stores flow definition data. Flow definition data refers to data including definition information relating to the process flow of a workflow (referred to as "flow definition" hereinafter). In the present embodiment, one set of flow definition data corresponds to one workflow. Accordingly, flow definition data is created for every workflow that has a different process flow from another workflow.

The job input unit 11 receives a workflow execution request and input data for the workflow specified in the workflow execution request, and inputs job information relating to a job for executing the workflow to the start job queue 121. In the present embodiment, a job for executing a workflow refers to an execution unit for executing the workflow. For example, in a case where the same workflow is executed multiple times, each execution of the workflow corresponds to a different job. Note that in the descriptions below, a job of a workflow is referred to as "flow job".

The start job queue 121 may store the job information input thereto in FIFO (First-In First-Out) format, for example. The job information may include job definition data that is generated based on a copy of flow definition data of a workflow to be executed, data to be processed such as image data transmitted from the image forming apparatus 30, and meta information of the flow job, for example. Meta information may include information such as the user name of a user that has issued an instruction to execute the flow job, the data size of the data to be processed, and the execution date of the flow job, for example. Note that in some embodiments, job information relating to one flow job may be stored and managed in one folder, for example.

When one or more sets of job information are stored in the start job queue 121, the flow execution control unit 12 moves the job information to be executed to the executing job storage unit 123 that is accessible by the process unit 13 according to the order in which the job information was stored in the start job queue 121. The flow execution control unit 12 controls execution of a flow job based on job information stored in the executing job storage unit 123. In other words, the process unit 13 refers to the job information stored in the executing job storage unit 123 to execute a corresponding process of the process unit 13. Note that in some embodiments, the executing job storage unit 123 may be created for each flow job, for example.

The process unit 13 executes a process ("activity" or "process unit") constituting a workflow. In one example, one activity may be implemented by one process unit 13. In this case, a workflow may be implemented by a series of connected processes executed by one or more process units 13 each configured to execute a different process, for example.

In the present embodiment, one or more processes (process units) constituting a workflow to be executed by the flow management server 10 may be generally classified into an input process, an intermediate process, a suspend process, or an output process. The input process may include a process of inputting data for a flow job from an external device such as the image forming apparatus 30, for example.

The intermediate process may include a process of modifying or manipulating data for a flow job, for example. Specific examples of an intermediate process include a noise removal process, an OCR (Optical Character Recognition) process, a translation process, and a data conversion process.

The suspend process may include a process of suspending the progress of a flow job in order to enable a user to intervene in the execution of the flow job. The suspended state of the flow job may be maintained until a resume instruction to resume the flow job is issued, for example.

The output process may include a process of outputting data generated by the flow job in a form usable by a user. Examples of outputting data in a form usable by the user include not only printing data on paper, but also electronically storing data or outputting data in other ways to enable the user to access and use the data via an application program, for example. In one example, the output process may be a delivery process for delivering data to a folder of a predetermined computer. In another example, a predetermined email address may be the delivery destination of the data. Also, the image forming apparatus 30 corresponding to the input source of image data or some other image forming apparatus 30 may be the delivery destination of the data. In this case, the image forming apparatus 30 corresponding to the delivery destination may print out the delivered data.

In FIG. 3, an OCR process unit 13a, a suspend process unit 13b, a mail transmission unit 13c, and an image correction process unit 13d are illustrated as examples of the process unit 13. The OCR process unit 13a executes an OCR process on data to be processed. The suspend process unit 13b executes a suspend process. That is, the suspend process unit 13b suspends a flow job that is being executed and enables a user to intervene in the execution of the flow job. The mail transmission process unit 13c transmits an email including an attachment of data to be processed to a predetermined email address. The image correction process unit 13d executes an image correction process such as noise removal on the data (image data) to be processed. Note that each process unit 13 may be implemented by the CPU 104 executing an independent program module, for example. In the descriptions below, a program module for enabling the flow management server 10 (CPU 104) to implement the function of the process unit 13 is referred to as a "plugin".

When a suspend process is executed during execution of a flow job and the flow job transitions to a suspended state, the suspend notification transmission unit 14 transmits a flow job suspend notification to the resume instruction apparatus 20 that is set up as a transmission destination of the suspend notification in the job definition data of the corresponding flow job. The job information transmission unit 15 transmits to the resume instruction apparatus 20, corresponding to the transmission destination of the flow job suspend notification, information relating to the flow job such as information included in the job information. The information transmitted by the job information transmission unit 15 may include information obtained up to the execution of the suspend process such as output information of the process unit 13 coming before the suspend process unit 13b according to the execution order of the flow job.

The resume request receiving unit 16 receives from the resume instruction apparatus 20 a resume request relating to the flow job that is currently suspended. When the resume request is received, execution of the flow job that is suspended may be resumed. Note that the resume request for the flow job may include a change instruction for changing the information that has been transmitted by the job information transmission unit 15. In this case, the execution of the flow job that is resumed may be controlled based on information such as job definition data that reflects the change applied thereto by the change instruction.

The resume instruction apparatus 20 includes a suspend notification receiving unit 21, a job information acquisition unit 22, a display control unit 23, and a resume request transmission unit 24. These functional units may be implemented by a CPU of the resume instruction apparatus 20 executing one or more programs that are installed on the resume instruction apparatus 20, for example. The program may be a script included in a web page, for example. In this case, the resume instruction apparatus 20 may include a web browser that is capable of interpreting such a script, for example.

The suspend notification receiving unit 21 receives the flow job suspend notification transmitted from the flow management server 10. The job information acquisition unit 22 acquires information such as job information of the flow job specified in the suspend notification from the flow management server 10. The display control unit 23 displays a screen for accepting change instructions for changing the job information acquired by the job information acquisition unit 22 from a user (hereinafter referred to as "edit job screen"). The resume request transmission unit 24 transmits a flow job resume request to the flow management server 10 after the editing operations by the user via the edit job screen are completed. The resume request includes editing results of editing the job information via the edit job screen. The editing results correspond to the change instructions for changing the job information and the like.

Note that in the present embodiment, the process unit 13 executes the intermediate process, the suspend process, and the output process of the processes constituting a workflow (i.e., input process, intermediate process, suspend process, and output process). In the input process, various types of external devices may be the input source of data to be processed. Also, the input method for inputting the data (acquisition method or receiving method as viewed from the flow management server 10) may vary depending on the type of the external device. In order to flexibly adapt to such circumstances, the job input unit 11 may have a configuration as illustrated in FIG. 4, for example.

Figure 4:
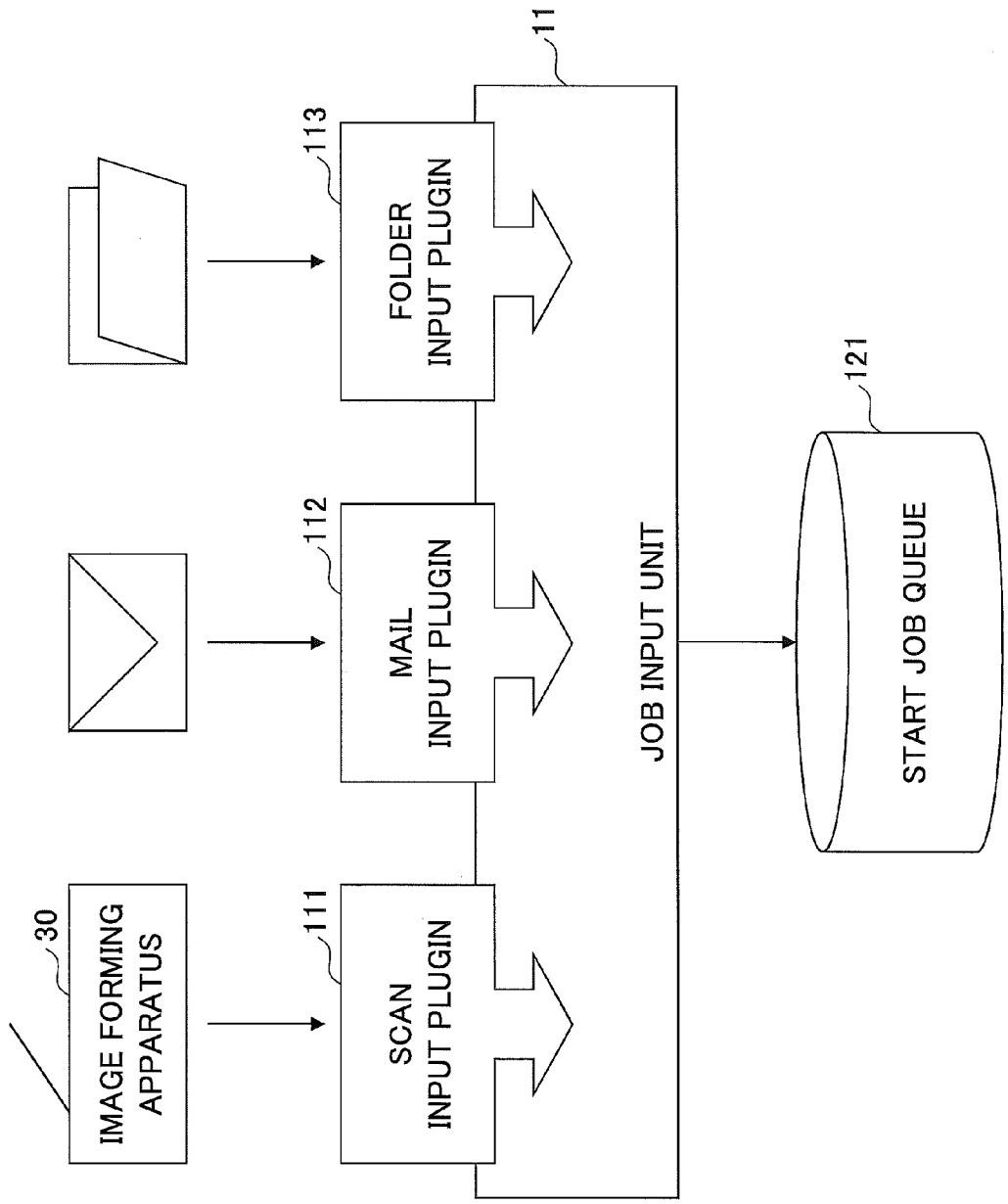
FIG. 4 illustrates an exemplary configuration of a job input unit.

FIG. 4 illustrates an exemplary configuration of the job input unit 11. As with the process unit 13, data exchange between the job input unit 11 and an input source of data may be implemented by a plugin corresponding to a program module that can be plugged into the job input unit 11. In FIG. 4, a scan input plugin 111, a mail input plugin 112, and a folder input plugin 113 are illustrated as examples of plugins installed on the job input unit 11.

The scan input plugin 111 is a plugin for receiving input data from the image forming apparatus 30. That is, the scan input plugin 111 is configured to receive from the image forming apparatus 30 image data scanned by the image forming apparatus 30 as input data. The scan input plugin 111 receives from the image forming apparatus 30 information such as a flow ID, setting information of the scanning process, and attribute information of the image data along with the image data. The scan input plugin 111 generates job information in a format prescribed by the flow execution control unit 12 based on the received flow ID and the image data and stores the job information in the start job queue 121. Note that the flow ID is identification information for identifying each workflow definition (i.e. each flow definition data).

The mail input plugin 112 is a plugin for accepting a workflow execution request via an email addressed to a predetermined email address. In this case, data that is attached to the email may be the data to be processed by the workflow. The data to be processed may be image data or data in some other format. The mail input plugin 112 acquires the email addressed to the predetermined email address from a mail server (not shown). The mail input plugin 112 generates job information in a format prescribed by the flow execution control unit 12 based on the data attached to the acquired email and information such as the flow ID described in the email and stores the job information in the start job queue 121. Note that an address of the sender of the email and the received date/time of the email may be included in the meta information of the flow job.

The folder input plugin 113 is a plugin for accepting a workflow execution request by uploading a file in a predetermined folder. The predetermined folder may be a folder created in the secondary storage unit 102 of the flow management server 10, or a folder created in a storage unit that is connected to the flow management server 10 via a network (e.g. storage unit of a file server, which is not shown), for example. The folder input plugin 113 may poll (periodically reference) the predetermined folder, and if a file storing data to be processed (hereinafter referred to as "data file") and a file storing information such as a flow ID and setting values (hereinafter referred to as "bibliographic file") are stored in the predetermined folder, the folder input plugin 113 may acquire the stored data file and bibliographic file. The folder input plugin 113 generates job information in a format prescribed by the flow execution control unit 12 based on information stored in the acquired data file and the acquired bibliographic file and stores the job information in the start job queue 121. Note that the information stored in the bibliographic file may correspond to the meta information of the flow job, for example.

Note that plugins for inputting data other than those described above may be added to the job input unit 11. For example, a plugin for accepting input data via a web page may be added.

As can be appreciated, according to an aspect of the present embodiment, process units such as an input process, an intermediate process, a suspend process, and an output process may each be implemented by a plugin. Accordingly, a wider variety of workflows may be defined and implemented by creating a plugin for executing a desired process and adding the created plugin, for example.

Figure 5:
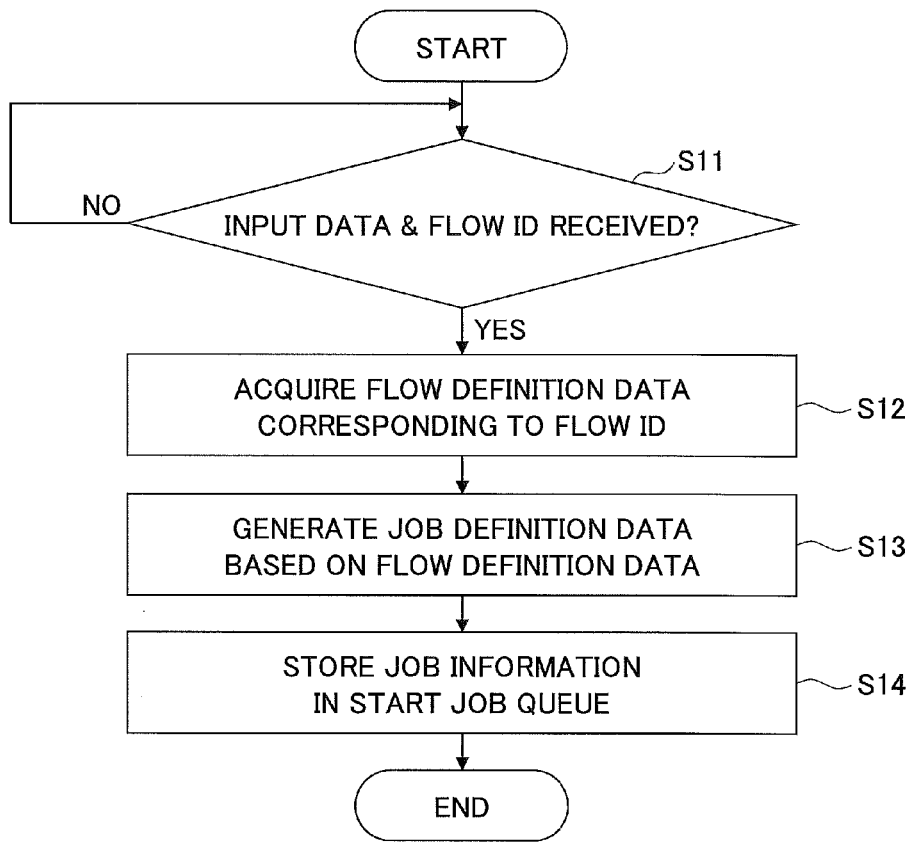
FIG. 5 is a flowchart illustrating exemplary process steps executed by the job input unit.

In the following, process steps executed by the job input unit 11 are described. FIG. 5 is a flowchart illustrating exemplary process steps executed by the job input unit 11. Note that strictly speaking, the plugins of the job input 11 causes the flow management server 10 to execute the process steps of FIG. 5.

When the job input unit 11 receives input data for a workflow, a flow ID of the workflow to be executed, and information corresponding to meta information of the flow job, for example (YES in step S11), the job input unit 11 acquires the flow definition data corresponding to the flow ID from the flow definition storage unit 124 (step S12). The input data may correspond to scanned image data in the case where the image forming apparatus 30 corresponds to the sender of the input data.

Figure 6:
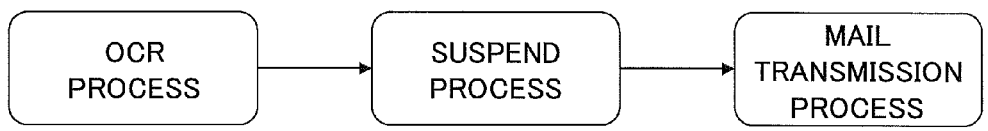
FIG. 6 illustrates a specific example of a workflow according to an embodiment of the present invention.

For example, a workflow as illustrated in FIG. 6 may be executed according to one embodiment of the present invention.

As illustrated in FIG. 6, according to the present example, first, an OCR process is executed with respect to image data included in job information transmitted from the image forming apparatus 30. By executing the OCR process, text data extracted from the image data may be output. Then, a suspend process is executed. By executing the suspend process, the user may be given an opportunity to change (edit) the text data, for example. Then, a mail transmission process is executed. In the mail transmission process, an email including the text data reflecting the change made by the user to the OCR process result as the subject of the email may be transmitted to an email address that is set up in the job definition data.

The flow definition data of the workflow illustrated in FIG. 6 may be defined by a data structure as illustrated in FIG. 7, for example. FIG. 7 illustrates an example of flow definition data 500 according to the present embodiment. In the example of FIG. 7, the flow definition data 500 is defined in the XML (eXtensible Markup Language) format. However, the flow definition data may be described in other data formats such as the CSV (Comma Separated Values) format, for example.

In FIG. 7, the flow definition data 500 includes flow elements enclosed by <flow> tags as root elements. The flow elements include an id element 510 and one or more plugin elements 520-540 as child elements. The value of the id element 510 ("Flow1") corresponds to a flow ID.

The plugin element is a definition of a process unit. The flow definition data 500 includes the plugin element 520 corresponding to the OCR process, the plugin element 530 corresponding to the suspend process, and the plugin element 540 corresponding to the mail transmission process. Each plugin element includes an order attribute. The value of the order attribute indicates the execution order of the process unit that is being defined by the plugin element. Also, each plugin element includes an id element, a displayName element, and a parameters element as child elements.

The value of the id element corresponds to identification information of the program (plugin) for prompting the flow management server 10 to function as the process unit 13 for executing a corresponding process. The flow execution control unit 12 may call the process unit 13 based on the value of the id element. The value of the displayName element corresponds to a character string to be displayed above a figure representing a corresponding process unit within an edit screen relating to the flow definition data. The parameters element is where an input parameter with respect to a corresponding process unit may be specified and/or a process result (output information) of the corresponding process unit may be recorded, for example. The input parameter and the output information may vary with respect to each process unit. Thus, the value structure of the parameters element may vary according to each process unit.

For example, the parameters element of the plugin element 520 corresponding to the OCR process includes a keyword element 521 and an ocrMode element 522. The keyword element 521 stores a result of the OCR process. In FIG. 7, the value of the keyword element 521 is empty. This is because the flow definition data 500 of FIG. 7 represents a state in which the result of the OCR process is not yet determined. That is, after the OCR process is executed based on job definition data generated from the flow definition data 500, a character string extracted by the OCR process is recorded as the value of the keyword element 521. The element name ("keyword") of the keyword element 521 indicates an OCR process range of image data that is subject to an OCR process. Specifically, "keyword" indicates that a range corresponding to the title of a document within an image representing the document is the OCR process range. Note that coordinates information of the range corresponding to the title of the document may be set up within the parameters element, or the information may be set up elsewhere.

The parameters element of the plugin element 530 corresponding to the suspend process includes a panel element 531, a panelAddress element 532, a panelSize element 533, a maxWaitingTime element 534, an errorHandling element 535, and displayParameter elements 536-539. The value of the panel element 531 indicates the type of the resume instruction apparatus 20 corresponding to the transmission destination of a suspend notification. For example, "mfp" represents an image forming apparatus. In the case where the resume instruction apparatus 20 corresponds to a PC, "pc" may be set up as the value of the panel element 531, for example. The value of the panelAddress element 532 indicates the IP address of the resume instruction apparatus 20. The value of the panelSize element 533 indicates a screen size of a display device of the resume instruction apparatus 20. The value of the maxWaitingTime element 534 indicates the maximum waiting time for a resume request to be issued after a flow job is suspended. The value of the errorHandling element 535 indicates a process to be executed in a case where a resume request is not issued even after the maximum waiting time elapses. For example, "skip" indicates skipping the process unit (suspend process). The values of the displayParameter elements 536-539 represent identification information of parameter values to be output (for display or editing) at the resume instruction apparatus 20. The identification information is described in the following format: "<value of id element of plugin element>/<tag name of element corresponding to parameter>". For example, the value "ocr/keyword" of the displayParameter element 536 indicates that the parameter value of the keyword element 521 of the plugin element 520 that includes the id element value "ocr" as a child element is to be output (displayed). The value "smtp/to1" of the displayParameter 537 indicates the parameter value of a to1 element 543 of the plugin element 540 that includes the id element value "smtp" as a child element is to be output (displayed). As can be appreciated, according to the present embodiment, in a suspend process, parameters including output information of another processing unit (e.g., OCR result) and setting information for another processing unit (e.g., destination address of email) may be set up as parameter elements.

The parameters element of the plugin element 540 corresponding to the mail transmission process includes a serverIp element 541, a portNumber element 542, the to1 element 543, a cc1 element 544, a cc2 element 545, and a subject element 546. The value of the serverIp element 541 indicates an IP address of an SMTP server corresponding to a destination of a request for transmitting an email. The value of the portNumber element 542 indicates a port number of the SMTP server corresponding to the mail transmission request destination. The value of the to1 element 543 indicates a first destination address of the email to be transmitted. The value of the cc1 element 544 indicates a first Cc address of the email to be transmitted. The value of the cc2 element 545 indicates a second Cc address of the email to be transmitted. The value of the subject element 546 indicates the subject of the email to be transmitted. Note that in the illustrated example, the value of subject element 546 is enclosed in curly brackets. This indicates that a value identified by the identification information specified within the curly brackets is to be used. The identification information "ocr/keyword" in the curly brackets identifies the value of the keyword element 521 in the plugin element 520 that includes the id element value "ocr". In other words, "ocr/keyword" identifies the character string extracted by the OCR process. Thus, the subject element 546 indicates that the character string extracted by the OCR process is to be used as the subject of the email.

Note that each child element of each of the parameters elements of the plugin elements 520, 530, and 540 includes a type attribute, an r attribute, and a w attribute. The value of the type attribute indicates the data type of the parameter value specified in the child element. The value of the r attribute indicates whether the user is able (allowed) to reference the corresponding parameter value when the flow job is executed. The value of the w attribute indicates whether the user is able (allowed) to write or update the parameter value when the flow job is executed. With respect to the r attribute and w attribute values, "true" indicates that the corresponding parameter value can be referenced or written, and "false" indicates that the corresponding parameter value cannot be referenced or written.

In step S12 of FIG. 5, the job input unit 11 acquired flow definition data with a value for the id element 510 corresponding to the flow ID received in step S11.

Then, in step S13, the job input unit 11 generates job definition data based on a copy of the acquired flow definition data.

FIG. 8 illustrates an example of job definition data 600a in an initial state according to the present embodiment. Note that features illustrated in FIG. 8 that are substantially identical to those illustrated in FIG. 7 are given the same reference numerals and their descriptions are omitted.

In FIG. 8, the job definition data 600a includes a jobInfo element as a root element. In other words, the job definition data 600a in the initial state includes a copy of the flow definition data 500 and the jobInfo element added thereto as the parent element of the flow element. The jobInfo element includes an id element 610 as a child element in addition to the flow element. The value of the id element 610 indicates a job ID. The job ID may be assigned by the job input unit 11, for example.

In step S14 of FIG. 5, the job input unit 11 stores the job information including the input data, the job definition data, and the meta information of the corresponding flow job in the start job queue 121. For example, a folder for the corresponding flow job may be generated under a predetermined folder that is used as the start job queue 121, and files storing the input data, the job definition data, and the meta information may be stored in the generated folder.

In the following, process steps that are executed when job information is stored in the start job queue 121 are described. FIG. 9 is a flowchart illustrating exemplary process steps that are executed by the flow execution control unit 12.

The flow execution control unit 12 may periodically reference the start job queue 121 to determine whether job information is stored in the start job queue 121 (step S101). If one or more sets of job information are stored in the start job queue 121 (YES in step S101), the flow execution control unit 12 retrieves, for example, the oldest job information of the stored job information from the start job queue 121, and moves the retrieved job information to the executing job storage unit 123 (step S102). In other words, the retrieved job information is deleted from the start job queue 121.

Then, the flow execution control unit 12 assigns "1" to a variable "i" (step S103). The variable "i" is a variable for storing the execution order of process units (processes) of a flow job to be executed (hereinafter referred to as "target flow job"). Note that in the descriptions below, a process unit to be executed i-th according to the execution order is referred to as "process unit i". Then, the flow execution control unit 12 assigns the total number of process units constituting the target flow job to the variable "N" (step S104). The total number of process units constituting the target flow job may be determined based on the job definition data.

Then, the flow execution control unit 12 determines whether the value of the variable "i" is less than or equal to the variable "N" (step S105). That is, the flow execution control unit 12 determines whether there is an unexecuted process unit among the process units constituting the target flow job.

If the value of the variable "i" is less than or equal to the variable "N", that is, if there is an unexecuted process unit (YES in step S105), the flow execution control unit 12 prompts the corresponding process unit 13 to execute the process unit i (step S106). For example, the flow execution control unit 12 may send an execution request to the corresponding process unit 13 to execute the process unit i. The execution request may include identification information of the target flow job (hereinafter referred to as "job ID"), for example. Upon receiving the execution request, the corresponding process unit 13 executes the process unit i based on the job information and returns a status of the process unit i to the flow execution control unit 12. In the present embodiment, the status of a process unit may take the values "completed", "suspended", or "error". "Completed" indicates that the process unit has been successfully completed. "Suspended" indicates that the process unit is suspended. "Error" indicates that the process unit has ended abnormally.

Then, the flow execution control unit 12 determines whether the returned status is "suspended" (step S107). If the status is not "suspended" (NO in step S107), the flow execution control unit 12 determines whether the status is "error" (step S108). If the status is not "error" (NO in step S108), the flow execution control unit 12 adds 1 to the variable "i" (step S109), and repeats the process from step S105 and onward. In other words, if the returned status is "completed", a subsequent process unit is executed.

On the other hand, if the status is "error" (YES in step S108), the flow execution control unit 12 executes an abnormal end process (step S110). For example, flow execution control unit 12 may move the job information of the target flow job that is stored in the executing job storage unit 123 to an area storing job information of a flow job flow that has ended in failure. After the abnormal end process is completed, the target flow job is ended.

If the status is "suspended" (YES in step S107), the flow execution control unit 12 moves the job information of the target flow job from the executing job storage unit 123 to the suspended job queue 122 (step S111). As a result, progress of the target flow job is suspended. Note that in the present embodiment, the process unit 13 that returns the status "suspended" to the flow execution control unit 12 corresponds to the suspend process unit 13*b*.

Then, the flow execution control unit 12 waits for a resume request for resuming the target flow job to be issued (step S112). When a resume request for resuming the target flow job is issued (YES in S112), the flow execution control unit 12 moves the job information of the target flow job that is stored in the suspended job queue 122 to the executing job storage unit 123 (step S113). Then, the process steps from step S106 and onward are repeated. Note that the process that has been suspended is executed (resumed) in step S106 in response to the resume request. That is, the suspend process unit 13*b* resumes the process that has been suspended in response to the resume request (corresponding to a second execution request), and this time, the process unit 13*b* returns the status "completed" to the flow execution control unit 12. In this way, the process operations of the flow job may be resumed.

For example, in step S102 of FIG. 9, job information including job definition data as illustrated in FIG. 8 may be acquired. If the value of the variable "i" is "1", an OCR process may be executed by the OCR process unit 13*a* on image data included in the job information at an accuracy level according to the value of the ocrMode element 522 based on the plugin element 520 that has the value "1" as the order attribute among the plugin elements included in the job definition data 600*a*. A character string output as a result of the OCR process by the OCR process unit 13*a* may be written in the keyword element 521 of the job definition data 600*a*.

FIG. 10 illustrates an example of job definition data after the OCR process is executed according to the present embodiment. Note that features illustrated in FIG. 10 that are substantially identical to those illustrated in FIG. 8 are given the same reference numerals and their descriptions are omitted.

In the job definition data 600*b* illustrated in FIG. 10, the value "abc" is added as the value of the keyword element 521. In other words, the job definition data 600*b* illustrates an example in which the character string "abc" has been extracted by an OCR process, and the job definition data 600*a* has been updated to reflect the OCR process result.

In the following, an exemplary case is described in which the variable "i" is "2". That is, a suspend process that is executed based on the plugin element 530 of the job definition data 600*b* is described.

Figure 12:
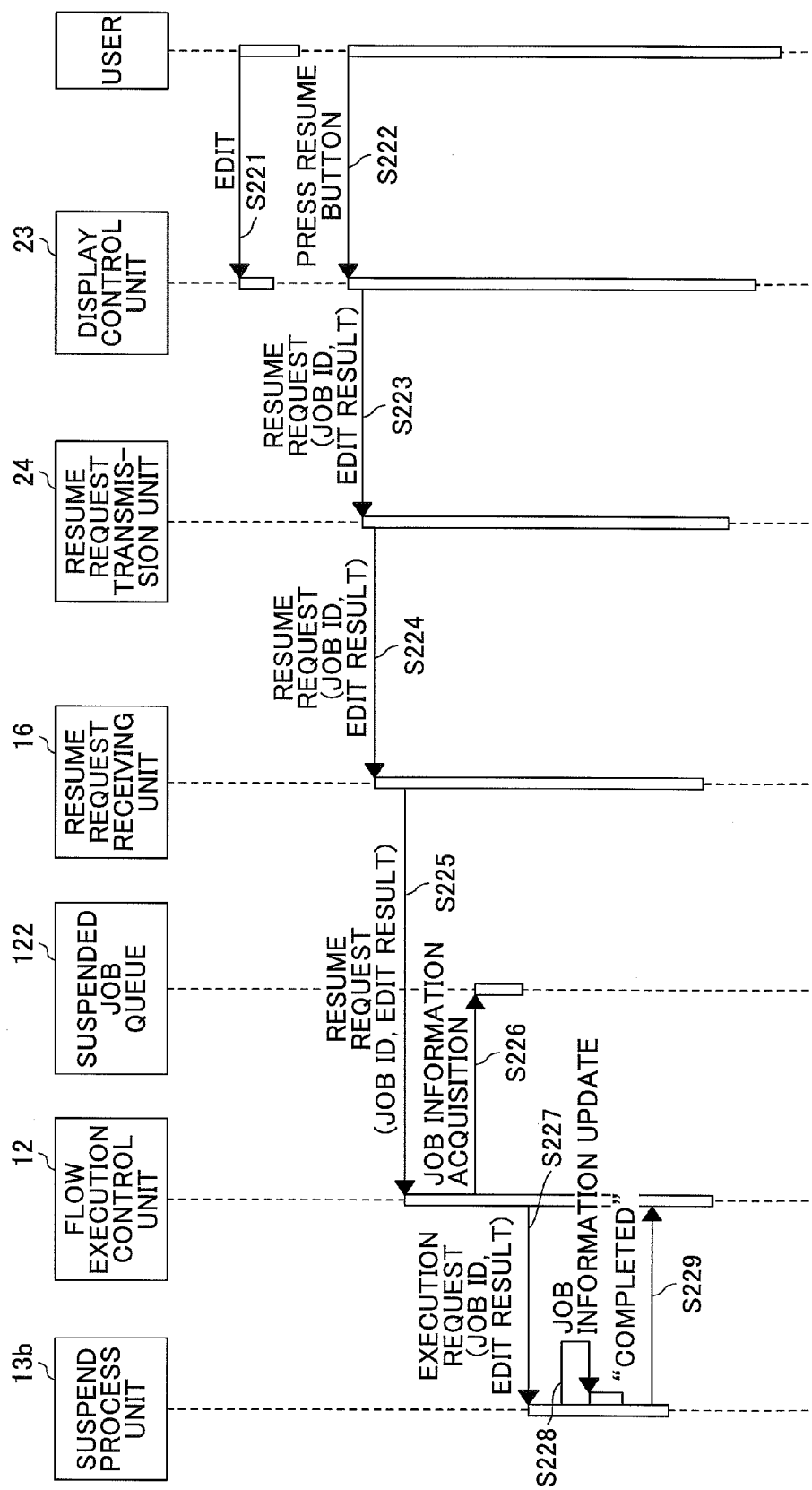
FIG. 12 is a sequence chart illustrating further exemplary process steps of the suspend process.

FIGS. 11 and 12 are sequence charts illustrating exemplary process steps of the suspend process.

In step S201, the flow execution control unit 12 transmits an execution request for executing a suspend process to the suspend process unit 13*b* that is identified based on the value ("suspend") of the id element within the plugin element 530 of the job definition data 600*b*. Note that the execution request transmitted from the flow execution control unit 12 to the suspend process unit 13*b* may include a job ID of the flow job to be executed (hereinafter referred to as "target job ID"), for example.

Then, the suspend process unit 13*b* refers to the job definition data 600*b* included in the job information identified by the target job ID (step S202), and acquires notification destination information from the job definition data 600*b* (step S203). The notification destination information refers to information on the destination of a suspend notification. In the job definition data 600*b* according to the present embodiment, the panel element 531, the panelAddress element 532, and the panelSize element 533 correspond to the notification destination information.

Then, the suspend process unit 13*b* transmits a suspend notification transmission request to the suspend notification transmission unit 14 to have a suspend notification transmitted to an IP address included in the destination information (step S204). The suspend notification transmission request includes the IP address as well as the target job ID. Then, the suspend notification transmission unit 14 transmits the suspend notification including the target job ID to the resume instruction apparatus 20 with the corresponding IP address specified in the suspend notification transmission request (step S205). Note that in a case where two or more sets of notification destination information are included in the plugin element 530 of the job definition data 600*b* (FIG. 10), the suspend notification may be transmitted to two or more resume instruction apparatuses 20, for example.

Then, the suspend notification receiving unit 21 of the resume instruction apparatus 20 corresponding to the suspend notification transmission destination receives the suspend notification and conveys the received suspend notification to the job information acquisition unit (step S206). The job information acquisition unit 22 specifies the job ID included in the suspend notification in a job information acquisition request for acquiring job information subject to editing and transmits the job information acquisition request to the job information transmission unit 15 of the flow management server 10 corresponding to the sender of the suspend notification (step S207). Note that address information of the job information transmission unit 15 may be included in the suspend notification, for example. Upon receiving the job information acquisition request, the job information transmission unit 15 conveys the received acquisition request to the suspend process unit 13*b* (step S208).

The suspend process unit 13*b* refers to the job definition data 600*b* identified by the job ID designated in the parameter information acquisition request (step S209), and acquires parameter information from the job definition data 600*b* (step S210). In the present example, the displayParameter elements 536-539 included in the job definition data 600*b* are acquired. In this case, parameter values within the job definition data 600*b* that are identified by the identification information represented by the values of the displayParameter elements 536-539 are acquired. The acquired values are included in the parameter information in association with the displayParameter elements 536-539 corresponding to their acquisition source. For example, based on the value "ocr/keyword" of the displayParameter element 536, the value of the keyword elements 521 ("abc") is acquired and this value is associated with the displayParameter element 536. Based on the value "smtp/to1" of the displayParameter element 537, the value of the to1 element 543 ("xxx1@abc.com") is acquired, and this value is associated with the displayParameter element 537. Based on the value "smtp/cc1" of the displayParameter 538, the value of the cc1 element 544 ("xxx2@abc.com") is acquired, and this value is associated with the displayParameter element 538. Based on the value "smtp/cc2" of the displayParameter 539, the value of the cc2 element 545 ("xxx3@abc.com") is acquired, and this value is associated with the displayParameter element 539.

Then, the suspend process unit 13*b* conveys a job information transmission request to the job information transmission unit 15 to have the acquired parameter information and the job definition data 600*b* with the corresponding target job ID to the sender of the job information acquisition request (step S211). Note that in some embodiments, the panel element 531 and the panelSize element 533 included in the notification destination information may be transmitted along with the parameter information, for example. Then, the job information transmission unit 15 transmits the parameter information and the job definition data 600*b* to the resume instruction apparatus 20 corresponding to the sender of the job information acquisition request (step S212). The job information acquisition unit 22 of the resume instruction apparatus 20 receives the parameter information and the job definition data 600*b*, specifies the parameter information and the job definition data 600*b* in a display request for displaying the job information on an edit job screen, and transmits the display request to the display control unit 23 (step S213). The display control unit 23 generates an edit job screen for accepting edits (changes) to the parameter information and the job definition data 600*b*, and controls the display unit of the resume instruction apparatus 20 to display the generated edit job screen (step S214). Note that in some embodiments, in the case where other relevant information relating to the display unit such as the panel element 531 and the panelSize element 533 are received along with the parameter information, the edit job screen may be generated based on such relevant information as well. In this way, a general-purpose generation logic may be used by the display control unit 23 in various types of the resume instruction apparatus 20 to generate the edit job screen. That is, a program for causing a device to function as a display control unit 23 of the resume instruction apparatus 20 may be less dependent on a particular type of the resume instruction apparatus 20, for example.

Figure 13:
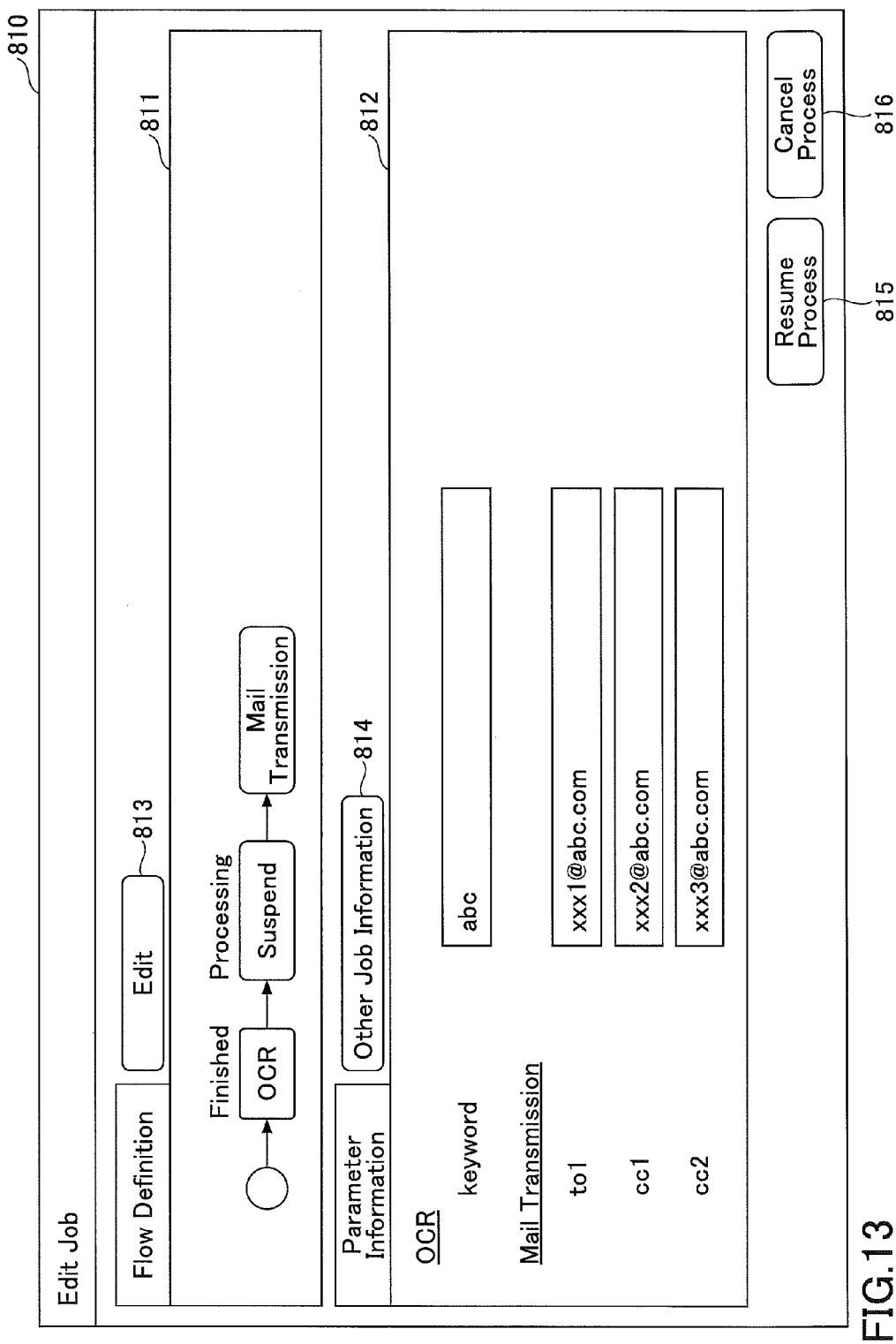
FIG. 13 illustrates an exemplary display of an edit job screen.

FIG. 13 illustrates an exemplary display of an edit job screen 810. In FIG. 13, the edit job screen 810 includes a display area 811, a display area 812, and buttons 813-816.

The display area 811 is an area where the flow definition of the target flow job is displayed. That is, the content displayed in the display area 811 is determined based on the job definition data 600*b*. FIG. 13 represents the flow definition of the workflow illustrated in FIG. 6. Note that in the display area 811, a rounded rectangle (referred to as "block" hereinafter) representing a process is displayed along with a mark "Finished" indicating that the corresponding process has been completed, and a block representing a process that is being executed is displayed along with a mark "Processing". In the present embodiment, "Finished" is indicated along with a block corresponding to the plugin element 520 that comes before the plugin element 530, and "Processing" is indicated along with a block corresponding to the plugin element 530. Note that in some embodiments, information indicating the process that is currently being executed may be acquired along with the parameter information and the job definition data 600*b* from the flow management server 10. In this case, "Processing" may be indicated along with the block corresponding to the process being executed, and "Finished" may be indicated along with the block corresponding to the process coming before the process that is being executed.

The display area 812 is an area where parameter information in the initial state is displayed. In the present example, based on the displayParameter elements 536-539, the corresponding values of the keyword element 521, the to1 element 543, the cc1 element 544, and the cc2 element 545 are output (displayed) in the display area 812. Thus, "abc" corresponding to the value of the keyword element 521 (i.e., OCR processing result) is displayed in association with "keyword" corresponding to the element name of the keyword element 521. Also, the values of the to1 element 543, the cc1 element 544, and the cc2 element 545 are displayed in association with "to1", "cc1", and "cc2" corresponding to the element names of the to1 element 543, the cc1 element 544, and the cc2 element 545. Note that each of the parameter values displayed in the display area 812 is editable if the value of the w attribute of the corresponding displayParameter element is "true", and is non-editable if the value of the w attribute of the corresponding displayParameter element is "false".

The button 814 is a button for accepting a display instruction for displaying meta information of the target flow job. For example, when the button 814 is pressed, the job information acquisition unit 22 may specify the job ID of the target flow job in a meta information acquisition request and transmit the meta information acquisition request to the job information transmission unit 15 of the flow management server 10. In turn, the job information transmission unit 15 may transmit the meta information of the job information associated with the specified job ID to the job information acquisition unit 22. The display control unit 23 may then display a screen for accepting edits to parameters included in the meta information. Thus, the user may be able to change the parameters included in the meta information via such a screen. Note that in some embodiments the meta information may be acquired along with the parameter information and the job definition data 600*b*, for example.

The button 813 is a button for accepting a display instruction for displaying an edit flow screen. That is, when the button 813 is pressed, the display control unit 23 displays the edit flow screen.

Figure 14:
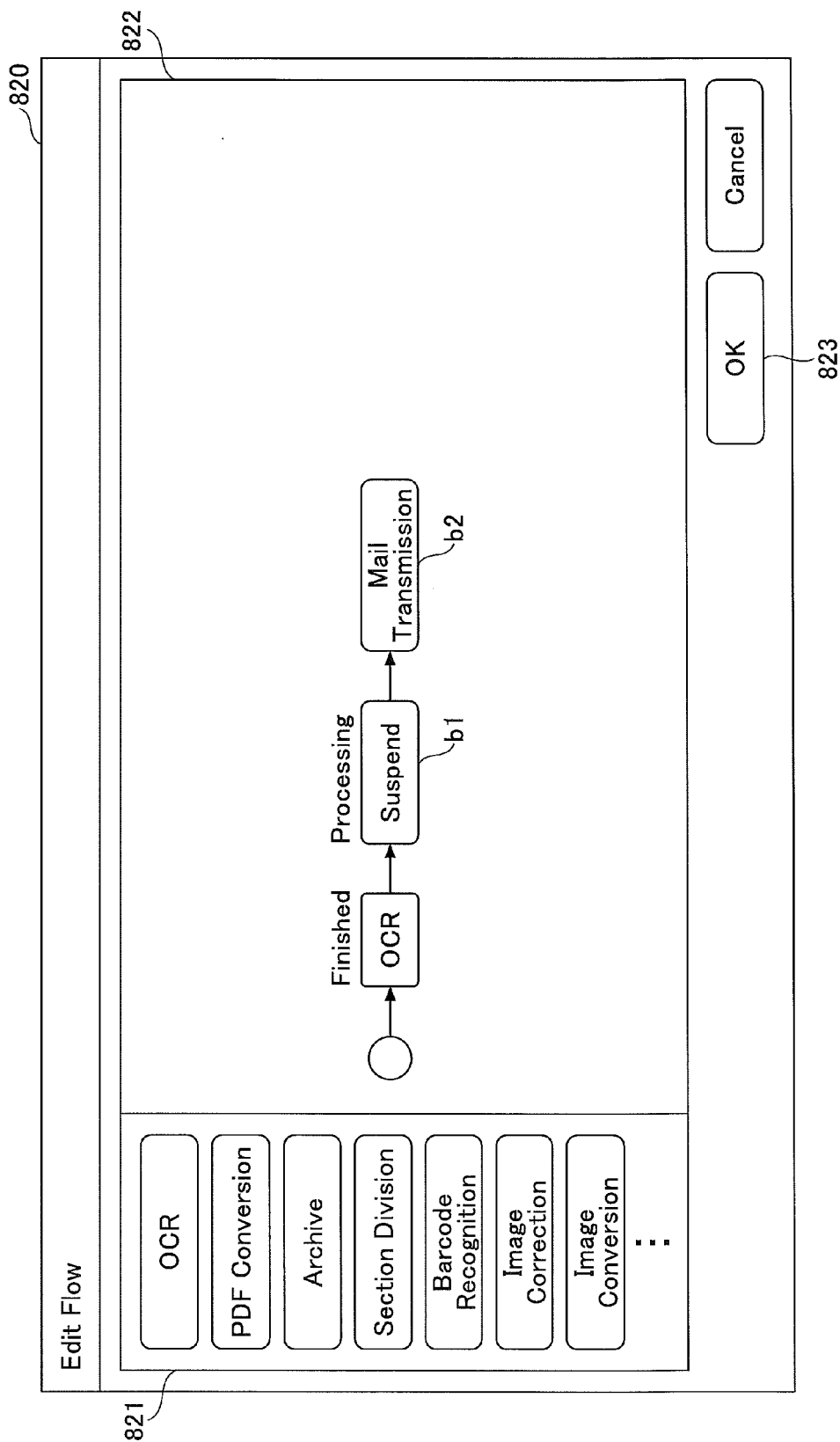
FIG. 14 illustrates an exemplary display of an edit flow screen.

FIG. 14 illustrates an exemplary display of an edit flow screen 820. In FIG. 14, the edit flow screen 820 includes a list area 821, a flow editing area 822, and an OK button 823. The list area 821 displays blocks representing processes that can be executed by the flow management server 10. A process that can be executed by the flow management server 10 refers to a process for which a corresponding plugin for enabling the flow management server 10 to execute the process is installed in the flow management server 10.

The flow editing area 822 is an area for enabling the user to make edits to the flow definition of the target flow job. Immediately after the edit flow screen 820 is displayed, the flow editing area 822 displays the same flow definition as that displayed in the display area 811 of the edit job screen 810. However, the blocks representing processes that are displayed in the edit flow screen 820 function as operation components. For example, when one of the blocks is double-clicked (selected), a parameter setting screen may be displayed for enabling the user to set up parameters constituting setting information for the process corresponding to the selected block. Note that because the parameters that can be set up for each process may be different, the configuration of the parameter setting screen for each process may be different. For example, for the OCR process, a parameter setting screen for enabling the user to set the values of parameters including the ocrMode element 522 (referred to as "OCR mode" hereinafter) may be displayed. By displaying such a parameter setting screen, the user may be able to set the parameters of each process of the target flow job to arbitrary values that are different from the preset values defined in the flow definition data 500.

Also, when the order in which the blocks representing processes are connected in the flow editing area 822 is rearranged by the user dragging and dropping one or more of the blocks, for example, the execution order of the processes corresponding to the blocks may be altered in accordance with the connection order of the blocks.

Also, when a block displayed in the list area 821 is dragged and dropped to the flow editing area 822, for example, the process corresponding to the dropped block may be added and executed in order according to the position where the block has been dropped. For example, when a block is dropped between block 1 corresponding to the suspend process and block b2 corresponding to the mail transmission process, the process corresponding to the dropped block is added and executed between the suspend process and the mail transmission process.

Also, a process included in a flow job may be deleted. For example, when a block representing a process that is displayed in the flow editing area 822 is selected, and a delete key is pressed, the process unit may be deleted from the target flow job.

Note that information indicating the processes that can be executed by the flow management server 10 (i.e., information required for displaying the list area 821) and information indicating the parameters that can be set up for each process (i.e., information required for displaying the parameter setting screen for each process) may be acquired from the flow management server 10 along with the parameter information and the job definition data 600b, for example. Alternatively, the information may be acquired from the flow management server 10 upon displaying the edit flow screen 820, for example.

After the suspend process unit 13b requests for transmission of the parameter information (step S211), the suspend process unit 13b returns a "suspended" status to the flow execution control unit 12 (step S215). Upon receiving the "suspended" status, the flow execution control unit 12 moves the job information of the target flow job that is stored in the executing job storage unit 123 to the suspended job queue 122 (step S216). Note that in some embodiments, the job information may remain stored in the executing job storage unit 123. In this case, information indicating that the corresponding flow job described by the job information is currently suspended may be added to the job information. In this way, the job information may be identified as that relating to a flow job that is currently suspended.

Then, the flow execution control unit 12 starts monitoring the maximum waiting time (step S217). The maximum waiting time is the value of the maxWaitingTime element 534 of the job definition data 600b.

Note that steps S201-S215 of FIG. 11 correspond to the process performed in step S106 of FIG. 9 in the case where the value of the variable "i" is "2". Also, step S216 corresponds to step S111 of FIG. 9.

Referring to FIG. 12, the user of the resume instruction apparatus 20 is then given an opportunity to edit (change) the values of the parameters via the edit job screen 810 or edit (change) the flow definition via the edit flow screen 820 (step S221).

In the following descriptions, it is assumed that the OCR process result was not the result expected by the user. Specifically, it is assumed that the OCR process failed to correctly recognize the title of the document as "abc" upon performing an OCR process on image data of the document scanned by the image forming apparatus 30.

Figure 15:
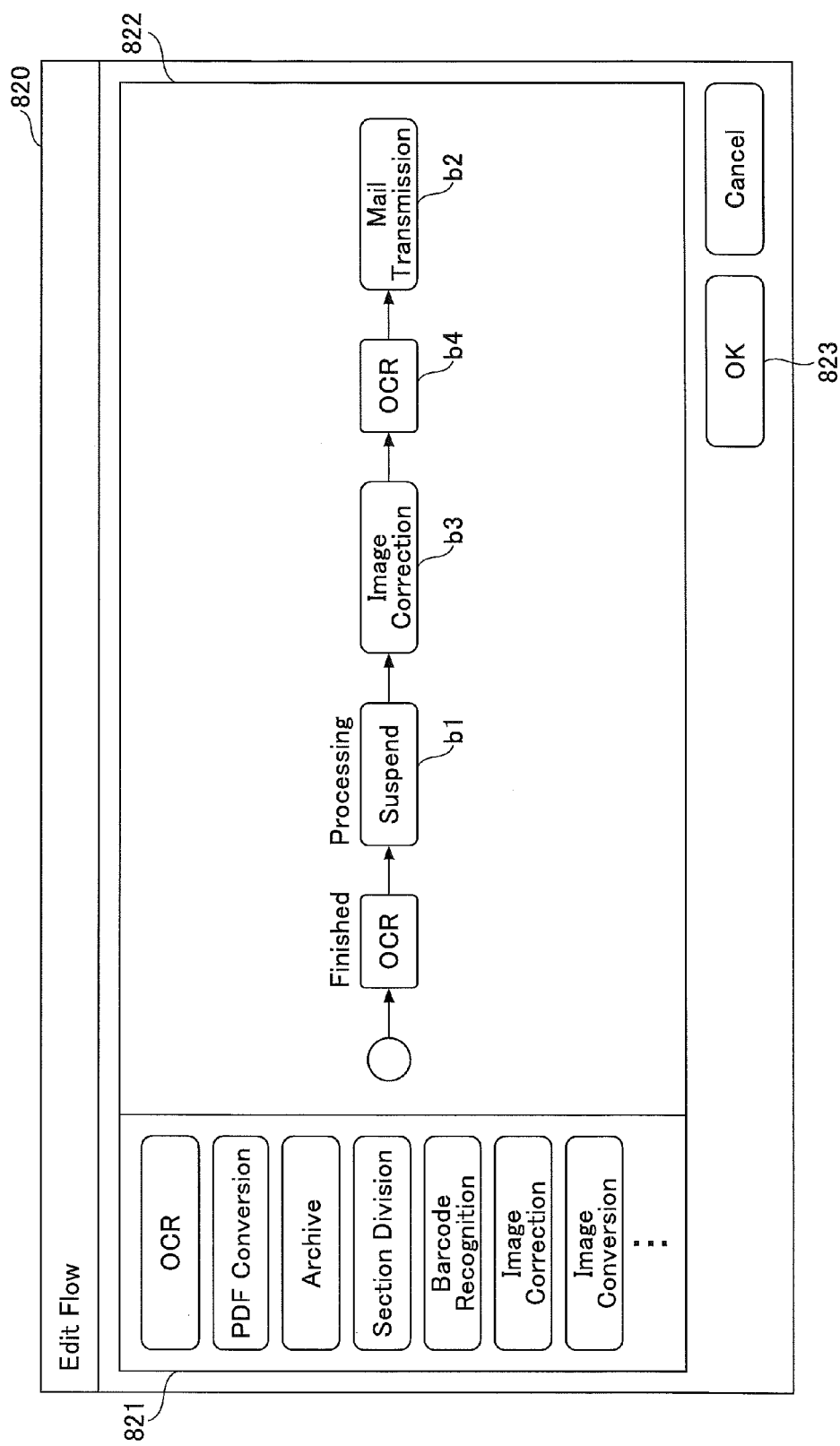
FIG. 15 illustrates an exemplary display of the edit flow screen after the flow definition is changed.

In this case, the user may edit (change) the flow definition of the target flow job at the edit flow screen 820 to that as illustrated in FIG. 15, for example. That is, the user may edit the flow definition to have the flow management server 10 re-execute the OCR process.

FIG. 15 illustrates an example of editing the flow definition at the flow edit screen 820. FIG. 15 illustrates an exemplary case where block b3 and block b4 have been dragged from the list area 821 and dropped between block b1 and block b2 to be added to the target flow job. That is, the flow definition has been modified such that after the target flow job is resumed; an image correction process may be performed on the image data, followed by an OCR process on the processing result of the image correction process, and a mail transmission process of the processing result. The image correction process is performed in order to remove noise and the like from the image data and improve accuracy of the OCR process. It is assumed that the value of the OCR mode has been set to "2" in the parameter setting screen for the OCR process corresponding to block b4. That is, the OCR process corresponding to block b4 has been set up to be executed at a higher accuracy than the OCR process executed the first time. When editing of the flow definition at the edit flow screen 820 has been completed and the OK button 823 is pressed, the result of editing the flow definition at the edit flow screen 820 is reflected in the display area 811 of the edit job screen 810. Note that the editing example shown in FIG. 15 is merely one illustrative example.

Figure 16:
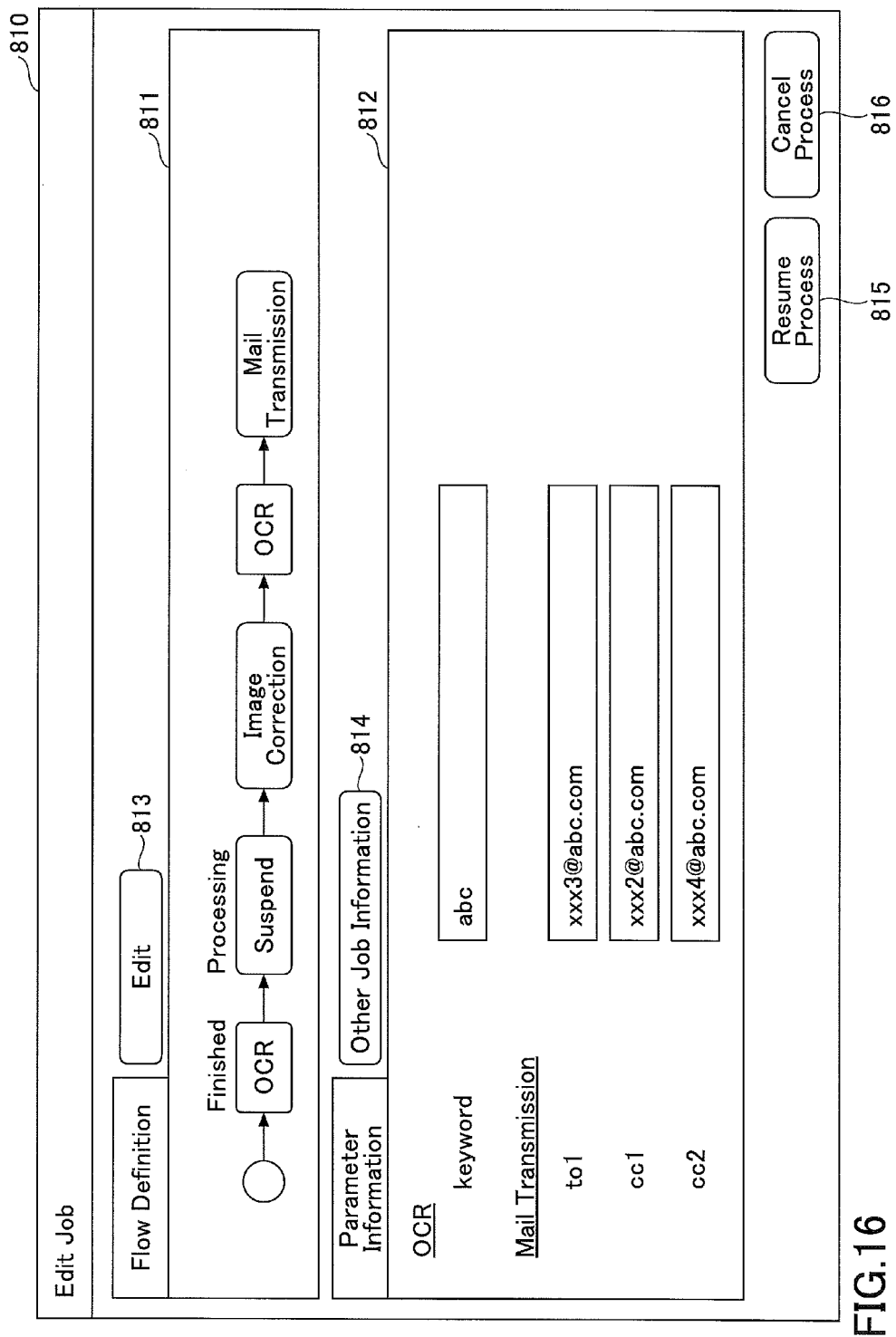
FIG. 16 illustrates exemplary editing of the edit job screen.

Further, in the following descriptions, it is assumed that before or after editing the flow definition, edits (changes) have been made to certain parameters as illustrated in FIG. 16.

FIG. 16 illustrates an example of editing parameters at the edit job screen 810. FIG. 16 illustrates an exemplary case where the values of the parameters "to1" and "cc2" in the display area 812 are changed. Also, the result of editing the flow definition as illustrated in FIG. 15 is reflected in the display area 811 of FIG. 16.

When the button 815 is pressed after such changes are made (step S222), the display control unit 23 requests the resume request transmission unit 24 to transmit a resume request for resuming the target flow job (step S223). The resume request includes information indicating the job ID of the target flow job and information indicating the editing results of edits made at the edit job screen 810 and the like.

In the present example, information indicating the result of editing the flow definition, and information indicating the result of editing parameters are included in the resume request. Note that in a case where a change is made to the meta information, the changed meta information may also be included in the resume request.

The resume request transmission unit 24 sends the resume request to the flow management server 10 (step S224). The resume request is received by the resume request receiving unit 16 of the flow management server 10. The resume request receiving unit 16 conveys the received resume request to the flow execution control unit 12 (step S225).

Upon receiving the resume request, the flow execution control unit 12 acquires job information associated with the job ID included in the resume request from the suspended job queue 122 and moves the acquired job information to the executing job storage unit 123 (step S226). Then, the flow execution control unit 12 sends an execution request for the second time to the suspend process unit 13b that has been switched to the status "suspended" (step S227). The execution request includes the job ID of the target flow job and the information included in the resume request.

Upon receiving the execution request for the second time, the suspend process unit 13b applies the information included in the execution request to the job definition data 600b and changes the job definition data 600b (step S228). Also, if the information included in the execution request contains a result of editing meta information, the meta information of the target flow job may also be changed accordingly. In the present example, the job definition data 600b is changed to become job definition data 600c as illustrated in FIG. 17.

FIG. 17 illustrates an example of job definition data after changes have been applied according to an embodiment of the present invention. Note that in FIG. 17, the contents of the plugin element 520 and the plugin element 530 as illustrated in FIGS. 8 and 10 are omitted for the sake of convenience.

In the job definition data 600c, a plugin element 550 and a plugin element 560 are added. The plugin element 550 is a plugin element corresponding to the newly added image correction process. The value of the order attribute of the plugin element 550 is set to "3". Thus, the image correction process corresponding to the plugin element 550 is to be executed third, namely, after the suspend process. The plugin element 560 is a plugin element corresponding to the newly added OCR process. The value of the order attribute of the plugin element 560 is set to "4". Thus, the OCR process corresponding to the plugin element 560 is to be executed fourth, namely, after the image correction process.

Also, changes are made to the plugin element 540. For example, the value of the order attribute 547 of the plugin element 540 is changed to "5". As a result, the mail transmission process corresponding to the plugin element 540 is to be executed fifth, namely, after the OCR process that is to be executed fourth. The value of the to1 element 543 is changed to "xxx3@abc.com". Further, the value of the cc2 element 545 is changed to "xxx4@abc.com".

Note that in a case where a process is deleted at the edit flow screen 820, in step S228, the plugin element corresponding to the deleted process is deleted, and 1 is subtracted from the value of the order attribute of each plugin element corresponding to each process that comes after the deleted process.

Also, in a case where the execution order of the processes is altered at the edit flow screen 820, in step S228, the values of the order attributes of the plugin elements corresponding to the processes that have been reordered are changed accordingly.

Then, the suspend process unit 13b returns a "completed" status to the flow execution control unit 12 (step S229). In this way, the flow execution control unit 12 may recognize that the suspend process of the suspend process unit 13b has been completed. Accordingly, the flow execution control unit 12 sends an execution request to the process unit 13 corresponding to the next process to be executed after the suspend process. In the present example, an image correction process is added as the process to be executed after the suspend process. Therefore, the flow execution control unit 12 sends an execution request to the image correction process unit 13d to have an image correction process executed. In turn, the image correction process unit 13d executes the image correction process on the image data that is included in the job information. The image correction process unit 13d then includes image data generated by the image correction process in the job information. Note that the image correction process unit 13d switches the data to be processed by subsequent processes from the initial image data (i.e., image data received from the image forming apparatus 30) to the image data generated by the image correction process. That is, in the present embodiment, at the time the flow job is started, the data included in the job information by the job input unit 11 is set up as the data to be processed by the process units 13. Thereafter, the data to be processed is determined by each process unit 13 of each process. In other words, when a given process is executed and the process unit 13 executing the process is configured to switch the data to be processed to new data, the data to be processed by the subsequent processes is switched to the new data. Note that the switching of the data to be processed may be realized by replacing the data stored in a folder for storing the data to be processed with the new data, for example.

Thus, in the OCR process that is executed after the image correction process, image data generated by the image correction process is subjected to processing. The OCR process unit 13a that executes the OCR process does not change the data to be processed. Thus, in the mail transmission process to be executed thereafter, the image data generated by the image correction process is used as the data to be processed (i.e., data to be attached to the email).

Note that in the present example, in the mail transmission process, the email is transmitted to a destination (address) that is different from that set up in the flow definition data 500. That is, the destination address of the email is set to "xxx3@abc.com". Also, the Cc address of the email is set to "xxx4@abc.com". Further, the text data generated from the OCR process executed for the second time is used as the subject of the email. That is, in the present example, the value "ocr/keyword" of the subject element 546 includes an element with the value "ocr" as an id element, indicating that reference is to be made to the value of the keyword element of the plugin element 560 that corresponds to the last plugin of the plugins executed before the plugin element 540 to which the subject element 546 belongs.

Note that when step S225 of FIG. 12 is executed, a positive determination (YES) is made in step 112 of FIG. 9. Also, step S226 of FIG. 12 corresponds to step S113 of FIG. 9, and step S227 of FIG. 12 corresponds to step S106 that is executed after step S113 of FIG. 9.

Also, note that if the maximum waiting time from the execution of step S217 of FIG. 11 elapses before step S225 of FIG. 12 is executed, the flow execution control unit 12 may determine that the suspend process (editing) should be skipped based on the value ("Skip") of the errorHandling element 535 of the job definition data 600b. Accordingly, the flow execution control unit 12 may transmit an execution request to the mail transmission process unit 13c to execute the next process of the flow job.

On the other hand, when the button 816 is pressed at the edit job screen 810 (FIG. 13), a flow job cancel request may be transmitted instead of the resume request along the same transmission path as the resume request (steps S223-S225). In this case, the flow execution control unit 12 cancels the execution of the target flow job without executing the processes of step S226 and the subsequent process steps.

Note that in some embodiments, the target flow job may be configured such that the user may be able to check the result of the OCR process that is executed for the second time. In this case, the suspend process may be inserted between the second OCR process and the mail transmission process. Also, although the above-described example relates to a case where an OCR process is executed for the second time when the user is not satisfied with the OCR process that is executed for the first time, in some embodiments, instead of editing (changing) the flow definition (i.e., adding the OCR process after the suspend process), the user may simply edit the value of the keyword displayed in the display area 812 of the edit job screen 810. In this case, in step 228, the value of the keyword element 521 of the job definition data 600b (FIG. 10) may be changed to reflect the editing of the keyword at the edit job screen 810.

Also, in the above-described example, the suspend process unit 13b applies the editing results of editing the edit job screen 810 and the edit flow screen 820 to the job definition data 600b. However, in some embodiments, the resume instruction apparatus 20 may be configured to apply such changes to the job definition data 600b, for example. In this case, the resume request transmission unit 24 of the resume instruction apparatus 20 may transmit the job definition data 600c that reflects the editing results to the flow management server 10 in step S224, for example.

Also, in the above-described example, parameters that affect the process operations of one process unit (mail transmission process) are changed. However, in other embodiments, one or more parameters that affect the process flow of the target flow job may be changed. For example, in a case where the process flow of a workflow branches out, one or more parameters used for determining the branching conditions of the process flow may be subject to editing.

As described above, according to an aspect of the present embodiment, the suspend process unit 13b may provide the user with an opportunity to change the flow definition, parameter information, output information of a process, and meta information of a flow job, for example. When such changes are made during the suspend process, the subsequent processes executed after the suspend process of the suspend process unit 13b may be executed based on the flow definition, parameter information, output information, and/or meta information reflecting the changes made in the suspend process. In this way, flexibility of the flow job may be enhanced, for example.

Note that aspects of the present invention may be applied to workflows other than the combination of processes as illustrated in FIG. 6. For example, in some embodiments, a barcode recognition process may be executed instead of the OCR process. A barcode recognition process refers to a process of extracting a character string embedded in a barcode that is included in an image. Information embedded in a barcode is difficult for the human eye to recognize. As such, in some embodiments, the barcode recognition process may be executed two or more times and the user may be given the opportunity to check the process result of each barcode recognition process. In this case, changes may be made to the parameters of each barcode recognition process, for example. In this way, the user may be able to check the results of barcode recognition processes that are executed a plurality of times under different conditions, and if all the process results match, the user may assume the accuracy of the process results of the barcode recognition processes, for example.

Also, in some embodiments, two or more suspend processes may be incorporated into one workflow, for example. Also, in a case where a suspend notification is to be transmitted to a plurality of resume instruction apparatuses 20, for example, information may be set up in the parameters element of the plugin element 530 of the flow definition data 500 indicating whether to maintain the suspended state until resume requests are received from all of the resume instruction apparatuses 20, or release the suspended state after resume requests are received from a part of the resume instruction apparatuses 20. Further, in the case where such information indicates that the suspended state should be maintained until resume requests are received from all of the resume instruction apparatuses 20, for example, the flow execution control unit 12 may wait until step S225 is executed with respect to all of the resume instruction apparatuses 20 corresponding to the plurality of suspend notification transmission destinations before executing step S226 and the subsequent process steps. On the other hand, in the case where such information indicates that the suspended state should be released after resume requests are received from a part of the resume instruction apparatuses 20, for example, the flow execution control unit 12 may execute step S226 and the subsequent process steps after step S225 is executed with respect to a part of the resume instruction apparatuses 20 corresponding to the plurality of suspend notification transmission destinations. The part of the resume instruction apparatuses 20 may be a specific number of the resume instruction apparatuses 20, or one or more specific resume instruction apparatuses 20 specified by their IP addresses, for example.

Also, in the case where a suspend notification is transmitted to a plurality of resume instruction apparatuses 20, a merging method for merging the editing results of editing the flow definition, parameter information, and/or meta information of the target flow job that are returned from the plurality of resume instruction apparatuses 20 may be set up in the parameters element of the plugin element 530, for example. The merging method may indicate that editing results other than those from one or more specific resume instruction apparatuses 20 may be disregarded, for example. That is, in some embodiments, the resume instruction apparatuses 20 that are allowed to make edits may be limited to one or more specific resume instruction apparatuses 20.

Also, in some embodiments, the process to be executed after the flow job is resumed may be specified at the edit job screen 810. For example, a process corresponding to one of the blocks displayed in the display area 811 that is selected at the edit job screen 810 may be the first process to be executed after the flow job is resumed. In this case, the following editing procedures may be implemented in order to execute processes substantially similar to those executed in accordance with the editing result as illustrated in FIG. 16, for example.

(1) At the edit flow screen 820, add a block corresponding to an image correction process before the first OCR process rather than adding a process unit block after the suspend process.

(2) After making the above edit (1), return to the edit job screen 810 and select the block corresponding to the image correction process that is displayed at the very front in the display area 811 and press the button 815.

In the case where such editing procedures are performed, the resume request transmission unit 24 may transmit the order of the block selected at the display area 811 (referred to as "resume position" hereinafter) along with the editing result to the flow management server 10. In turn, after step S229, the flow execution control unit 12 of the flow management server 10 may set the value of the resume position included in the resume request as the variable "i" in the process of FIG. 9 and execute the processes of step S106 and the subsequent process steps.

Note that the flow management server 10 of the above-described embodiment is an example of an information processing apparatus and an information processing system. The flow execution control unit 12 is an example of a process control unit. The suspend process is an example of a first process. The job information transmission unit 15 is an example of an output unit. The resume request receiving unit 16 is an example of an accepting unit. The suspend process unit 13*b* is an example of an application unit. The job information transmission unit 15 transmitting job definition data to have the job definition data displayed (output) by the resume instruction apparatus 20 is an exemplary way of causing the definition information to be output (displayed) in a form changeable (editable) by a user.

Although the present invention has been described above with reference to certain illustrative embodiments, the present invention is not limited to these embodiments, and numerous variations and modifications may be made without departing from the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU and the RAM may operate as a physical memory or a primary memory of the apparatus, while the HDD may operate as a secondary memory of the apparatus.

The present application is based on and claims the benefit of priority of Japanese Patent Application No. 2014-136514 filed on Jul. 2, 2014, the entire contents of which are hereby incorporated by reference.

What is claimed is:

1. An information processing apparatus comprising:
a memory; and
a processor coupled to the memory and configured to execute instructions stored in the memory to implement
a process control unit configured to control execution of one or more processes with respect to image data in an order defined by definition information and manage an execution result of each of the one or more processes, the image data being designated and input by a user;
an output unit configured to cause an intermediate result of the definition information to be output in a form changeable by the user when a first process of the one or more processes is suspended after the one or more processes are started by the process control unit, the intermediate result of the definition information being the execution result of executing the one or more processes before the first process is suspended;
an accepting unit configured to accept information indicating a change to the definition information; and
an application unit configured to apply the change indicated by the information accepted by the accepting unit to the definition information;
wherein the process control unit controls execution of a subsequent process of the one or more processes that is executed after the first process is resumed based on the definition information that reflects the change applied thereto by the application unit.

2. The information processing apparatus as claimed in claim 1, wherein the accepting unit accepts information for changing the subsequent process to be executed after the first process is resumed that is defined by the definition information.

3. The information processing apparatus as claimed in claim 2, wherein the accepting unit accepts information for changing setting information of the one or more processes that are defined by the definition information.

4. The information processing apparatus as claimed in claim 1, wherein the accepting unit accepts information for changing an execution order of the subsequent process to be executed after the first process is resumed that is defined by the definition information.

5. The information processing apparatus as claimed in claim 4, wherein the accepting unit accepts information for changing setting information of the one or more processes that are defined by the definition information.

6. The information processing apparatus as claimed in claim 1, wherein the accepting unit accepts information for changing setting information of the one or more processes that are defined by the definition information.

7. An information processing system including at least one information processing apparatus, the information processing system comprising:
a memory; and
a processor coupled to the memory and configured to execute instructions stored in the memory to implement a process control unit configured to control execution of one or more processes with respect to image data in an order defined by definition information and manage an execution result of each of the one or more processes, the image data being designated and input by a user;

an output unit configured to cause an intermediate result of the definition information to be output in a form changeable by the user when a first process of the one or more processes is suspended after the one or more processes are started by the process control unit, the intermediate result of the definition information being the execution result of executing the one or more processes before the first process is suspended;

an accepting unit configured to accept information indicating a change to the definition information; and an application unit configured to apply the change indicated by the information accepted by the accepting unit to the definition information;

wherein the process control unit controls execution of a subsequent process of the one or more processes that is executed after the first process is resumed based on the definition information that reflects the change applied thereto by the application unit.

8. The information processing system as claimed in claim 7, wherein the accepting unit accepts information for changing the subsequent process to be executed after the first process is resumed that is defined by the definition information.

9. The information processing system as claimed in claim 8, wherein the accepting unit accepts information for changing setting information of the one or more processes that are defined by the definition information.

10. The information processing system as claimed in claim 7, wherein the accepting unit accepts information for changing an execution order of the subsequent process to be executed after the first process is resumed that is defined by the definition information.

11. The information processing system as claimed in claim 10, wherein the accepting unit accepts information for changing setting information of the one or more processes that are defined by the definition information.

12. The information processing system as claimed in claim 7, wherein the accepting unit accepts information for changing setting information of the one or more processes that are defined by the definition information.

13. An information processing method implemented by an information processing system including at least one information processing apparatus having a processor coupled to a memory, the processor being configured to execute instructions stored in the memory to perform the information processing method comprising:

controlling execution of one or more processes with respect to image data in an order defined by definition information and managing an execution result of each of the one or more processes, the image data being designated and input by a user;

causing an intermediate result of the definition information to be output in a form changeable by the user when a first process of the one or more processes is suspended after the one or more processes are started by the process control unit, the intermediate result of the definition information being the execution result of executing the one or more processes before the first process is suspended;

accepting information indicating a change to the definition information; and applying the change indicated by the accepted information to the definition information; and controlling execution of a subsequent process of the one or more processes that is executed after the first process is resumed based on the definition information that reflects the change applied thereto.

14. The information processing method as claimed in claim 13, wherein the accepting step includes accepting information for changing the subsequent process to be executed after the first process is resumed that is defined by the definition information.

15. The information processing method as claimed in claim 14, wherein the accepting step includes accepting information for changing setting information of the one or more processes that are defined by the definition information.

16. The information processing method as claimed in claim 13, wherein the accepting step includes accepting information for changing an execution order of the subsequent process to be executed after the first process is resumed that is defined by the definition information.

17. The information processing method as claimed in claim 16, wherein the accepting step includes accepting information for changing setting information of the one or more processes that are defined by the definition information.

18. The information processing method as claimed in claim 13, wherein the accepting step includes accepting information for changing setting information of the one or more processes that are defined by the definition information.

* * * * *